United States Patent
Tang

(10) Patent No.: US 11,600,294 B2
(45) Date of Patent: Mar. 7, 2023

(54) MAGNETIC MEDIA DESIGN WITH MULTIPLE NON-MAGNETIC EXCHANGE CONTROL LAYERS AND GRADED MAGNETIC SUBLAYERS

(71) Applicant: Western Digital Technologies, Inc., San Jose, CA (US)

(72) Inventor: Kai Tang, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 56 days.

(21) Appl. No.: 17/162,165

(22) Filed: Jan. 29, 2021

(65) Prior Publication Data

US 2021/0151076 A1    May 20, 2021

Related U.S. Application Data

(63) Continuation-in-part of application No. 15/959,120, filed on Apr. 20, 2018, now Pat. No. 10,923,147.

(51) Int. Cl.
  *G11B 5/667* (2006.01)
  *G11B 5/84* (2006.01)

(52) U.S. Cl.
  CPC ............ *G11B 5/667* (2013.01); *G11B 5/8404* (2013.01)

(58) Field of Classification Search
  CPC ......... G11B 5/667; G11B 5/8408; G11B 5/84; G11B 5/672; G11B 5/64; G11B 5/66; G11B 5/676; G11B 5/678
  See application file for complete search history.

(56) References Cited

U.S. PATENT DOCUMENTS 8,119,263 B2   2/2012   Nolan et al.
8,168,310 B2   5/2012   Bian et al.
(Continued)

FOREIGN PATENT DOCUMENTS

WO   2010038448 A1   4/2010
WO   2015095773 A1   6/2015

OTHER PUBLICATIONS

Tang et al., "A Study of Perpendicular Magnetic Recording Media With an Exchange Control Layer"; IEEE Transactions on Magnetics; vol. 44, No. 11; Nov. 2008; https://ieeexplore.ieee.org/document/4717534; 4 pages.
(Continued)

*Primary Examiner* — Holly Rickman
(74) *Attorney, Agent, or Firm* — Loza & Loza, LLP; Gabriel Fitch

(57) ABSTRACT

Magnetic media including a magnetic recording layer structure formed of alternating magnetic recording sublayers and non-magnetic exchange control sublayers. The magnetic recording layer structure may include at least one magnetic recording sublayer formed to include a pair of thin films, with the films having different concentrations of platinum, ruthenium, and/or oxide segregants. That is, the sublayer has a "dual layer" structure. The dual layer structure can provide a gradient in magnetic anisotropy, saturation magnetization, and/or intergranular magnetic exchange coupling across the sublayer. In some examples, the film nearer to the substrate of the magnetic media has a higher platinum concentration than the other film. In one aspect, the magnetic media includes the substrate and the magnetic recording layer structure on the substrate, with the structure including six magnetic recording sublayers. In another aspect, a method of fabricating magnetic media with such structures is provided.

28 Claims, 11 Drawing Sheets

(56) References Cited

U.S. PATENT DOCUMENTS

| | | |
|---|---|---|
| 9,028,985 B2 | 5/2015 | Desai et al. |
| 9,129,638 B1 | 9/2015 | Choe et al. |
| 9,142,240 B2 | 9/2015 | Nolan et al. |
| 9,190,094 B2 | 11/2015 | Hong et al. |
| 9,245,564 B2 | 1/2016 | Arnoldussen et al. |
| 9,672,856 B1 | 6/2017 | Tonooka et al. |
| 2004/0009372 A1 | 1/2004 | Ataka et al. |
| 2010/0247962 A1 | 9/2010 | Sasaki |
| 2011/0003175 A1 | 1/2011 | Valcu et al. |
| 2016/0267935 A1 | 9/2016 | Ikeda |
| 2017/0221515 A1 | 8/2017 | Inoue et al. |
| 2019/0325905 A1 | 10/2019 | Tang et al. |
| 2020/0321024 A1 | 10/2020 | Ikeda |

OTHER PUBLICATIONS

Bai et al., "Effective Field Analysis of Segmented Media for Microwave Assisted Magnetic Recording"; IEEE Magnetics Letters, vol. 8; 2017; Digital Object Identifier 10.1109/LMAG.2017.2734047; https://www.researchgate.net/publication/318801902_Effective_Field_Analysis_of_Segmented_Media_for_Microwave_Assisted_Magnetic_Recording; 5 pages.

MAGNETIC MEDIA DESIGN WITH MULTIPLE NON-MAGNETIC EXCHANGE CONTROL LAYERS AND GRADED MAGNETIC SUBLAYERS

CROSS-REFERENCE TO RELATED APPLICATIONS

This application is a continuation-in-part of U.S. patent application Ser. No. 15/959,120, filed Apr. 20, 2018, entitled "MAGNETIC MEDIA DESIGN WITH MULTIPLE NON-MAGNETIC EXCHANGE CONTROL LAYERS," the entire content of which is incorporated herein by reference.

FIELD

Aspects of the present invention relate to magnetic media designs, and more specifically to magnetic media designs with an alternating pattern of non-magnetic exchange control sublayers and magnetic recording sublayers.

INTRODUCTION

Increasing the recording density of hard disk drives (HDDs) is becoming ever more challenging. Two key approaches to increasing the areal density capacity (ADC) of HDDs have included increasing the media signal-to-noise ratio (SNR), which leads to an increase in the linear density of the recording bits, and reducing the track width, which leads to an increase in the recording track density. Media structure designs that utilize an exchange-coupled composite have proven to be effective at increasing the ADC. In such media structures, magnetic recording sublayers and non-magnetic exchange control sublayers (ECLs) are deposited in an alternating fashion. The magnetic recording sublayers store the magnetic information, while the ECLs provide vertical decoupling between adjacent magnetic sublayers to reduce noise and improve media writability, allowing optimum balance between media SNR, writability and thermal stability. In historic and current HDD products, magnetic recording layer structures including up to five ECLs have been utilized.

SUMMARY

One aspect of the present disclosure provides a magnetic medium including a substrate and a magnetic recording layer structure on the substrate. The magnetic recording layer structure includes an alternating pattern of magnetic recording sublayers and non-magnetic exchange control sublayers. In some aspects, at least one of the magnetic recording sublayers comprises first and second films, with the first film nearer to the substrate than the second film, and with the first film having a higher concentration of platinum (Pt) than the second film. In some aspects, the higher concentration of platinum in the first film relative to the second film provides for a gradient across the sublayer in magnetic anisotropy (Ku) that may improve ADC.

In some additional aspects, at least one of the magnetic recording sublayers comprises first and second films, with the first film nearer to the substrate than the second film, and with the first film having a lower concentration of ruthenium (Ru) than the second film. In some aspects, the lower concentration of Ru in the first film relative to the second film provides for a gradient across the sublayer in Ku and magnetization (Ms) that may improve ADC. In some further aspects, at least one of the magnetic recording sublayers comprises first and second films, with the first film nearer to the substrate than the second film, and with the first film having a higher concentration of oxide segregants (including, but not limited to one or more of $TiO_2$, $B_2O_3$, $SiO_2$, $Cr_2O_3$, MnO, CoO, etc.) than the second film. In some aspects, the higher concentration of oxide segregants in the first film relative to the second film provides for a gradient across the sublayer in intergranular magnetic exchange coupling that may improve ADC.

Another aspect of the present disclosure provides a magnetic medium that includes: a substrate; and a magnetic recording layer structure on the substrate. The magnetic recording layer structure comprises an alternating pattern of magnetic recording sublayers and non-magnetic exchange control sublayers; wherein the magnetic recording sublayers comprise a first magnetic recording sublayer nearest to the substrate, a second magnetic recording sublayer farthest from the substrate, and one or more intermediate magnetic recording sublayers, and wherein the first and second magnetic recording sublayers are thicker than each of the one or more intermediate magnetic recording sublayers; and wherein at least one of the first and second magnetic recording sublayers comprises at least two films with different concentrations of platinum.

Yet another aspect of the present disclosure provides a method for fabricating a magnetic medium. The method includes providing a substrate, forming a soft underlayer on the substrate, forming a seed layer on the soft underlayer, and forming a magnetic recording layer structure on the seed layer. The magnetic recording layer structure includes an alternating pattern of magnetic recording sublayers and non-magnetic exchange control sublayers. In some aspects, at least one of the magnetic recording sublayers comprises first and second films, with the first film nearer to the substrate than the second film, and with the first film formed to have a higher concentration of platinum than the second film.

In some additional aspects, at least one of the magnetic recording sublayers formed by the method comprises first and second films, with the first film nearer to the substrate than the second film, and with the first film having a lower concentration of Ru than the second film. In some further aspects, at least one of the magnetic recording sublayers comprises first and second films, with the first film nearer to the substrate than the second film, and with the first film having a higher concentration of oxide segregants (including, but not limited to one of mores of $TiO_2$, $B_2O_3$, $SiO_2$, $Cr_2O_3$, MnO, CoO, etc.) than the second film.

DETAILED DESCRIPTION

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Magnetic Media with Multiple Non-Magnetic Exchange Control Layers

Referring first to FIGS. 1-5, magnetic recording media and methods for fabrication of such media will be described wherein the magnetic media has an alternating pattern of six magnetic recording sublayers and non-magnetic exchange control sublayers (ECLs). One such magnetic medium includes a substrate, a soft underlayer on the substrate, a seed layer on the soft underlayer, optional intermediate layer(s), and the magnetic recording layer structure.

The sixth magnetic recording sublayer and the sixth ECL may be added to the magnetic recording layer structure to increase ADC. However, simply adding a sixth magnetic recording sublayer and a sixth ECL can result in thickening of the total magnetic stack, and consequently, reduction of media SNR at both 1 T (maximum product linear density) and 2 T (half of the maximum product linear density), as compared to a five ECL magnetic recording layer structure. Reducing the total magnetic stack thickness may increase the SNR, but decrease the coercivity (Hc) and widen the magnetic core width (MCW), resulting in no ADC gain. Therefore, in some aspects, the magnetic recording layer structure includes a gradient of platinum content across the magnetic recording sublayers to produce a magnetic anisotropy, Ku, gradient across the magnetic recording layer structure.

Figure 1:
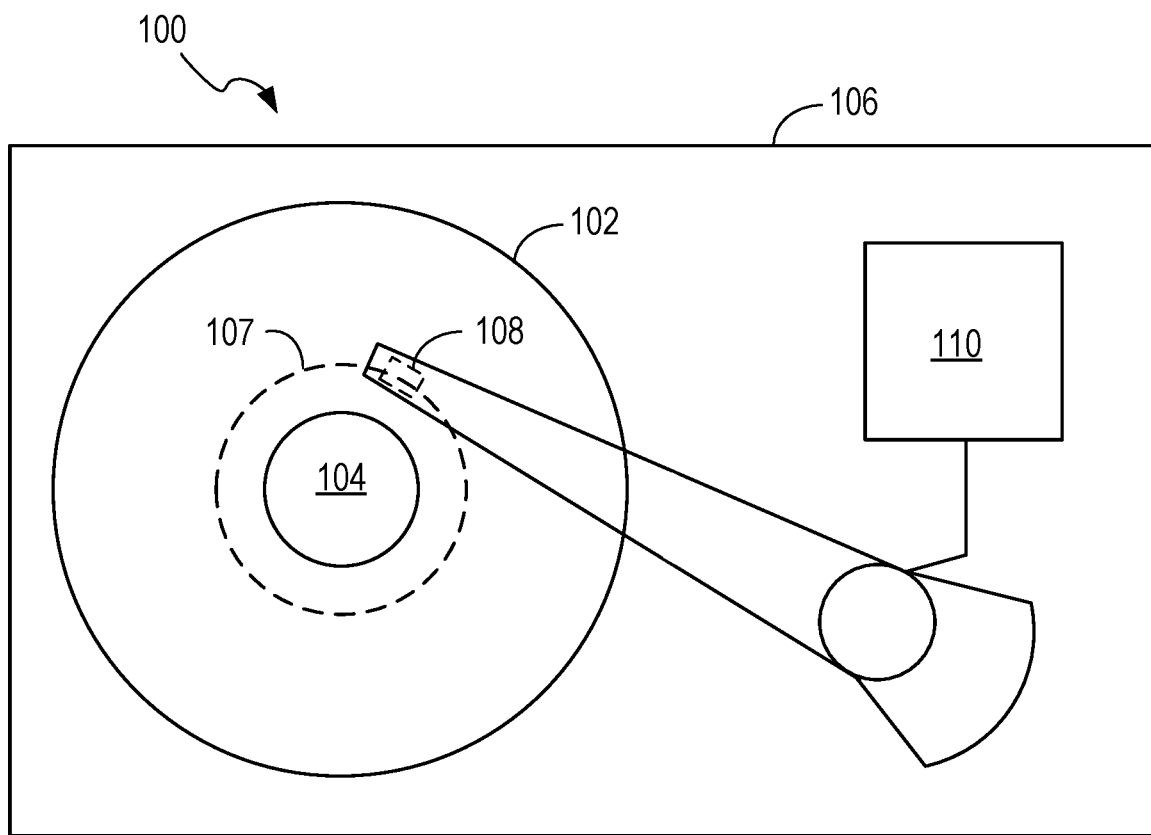
FIG. 1 is a top schematic view of a disk drive configured for magnetic recording and including a magnetic medium with a magnetic recording layer structure having multiple non-magnetic exchange control sublayers in accordance with one embodiment of the disclosure.

FIG. 1 is a top schematic view of a disk drive 100 configured for magnetic recording and including a magnetic medium 102 with a magnetic recording layer (MRL) structure including at least six magnetic recording sublayers and at least six non-magnetic exchange control sublayers arranged in an alternating fashion in accordance with one embodiment of the disclosure. In some examples, the magnetic medium 102 may include a perpendicular magnetic recording (PMR) medium, shingle-written magnetic recording (SMR) medium, or a microwave assisted magnetic recording (MAMR) medium.

Disk drive 100 may include one or more disks/media 102 to store data. Disk/media 102 resides on a spindle assembly 104 that is mounted to drive housing 106. Data may be stored along tracks 107 in the magnetic recording layer of disk 102. The reading and writing of data is accomplished with the head/slider 108 that may have both read and write elements. The write element is used to alter the properties of the magnetic recording layer of disk 102 and thereby write information thereto. In one embodiment, head 108 may have magneto-resistive (MR), or giant magneto-resistive (GMR) elements. In another embodiment, head 108 may be another type of head, for example, an inductive read/write head or a Hall effect head.

In operation, a spindle motor (not shown) rotates the spindle assembly 104, and thereby rotates disk 102 to position head 108 at a particular location along a desired disk track 107. The position of head 108 relative to disk 102 may be controlled by position control circuitry 110.

Figure 2:
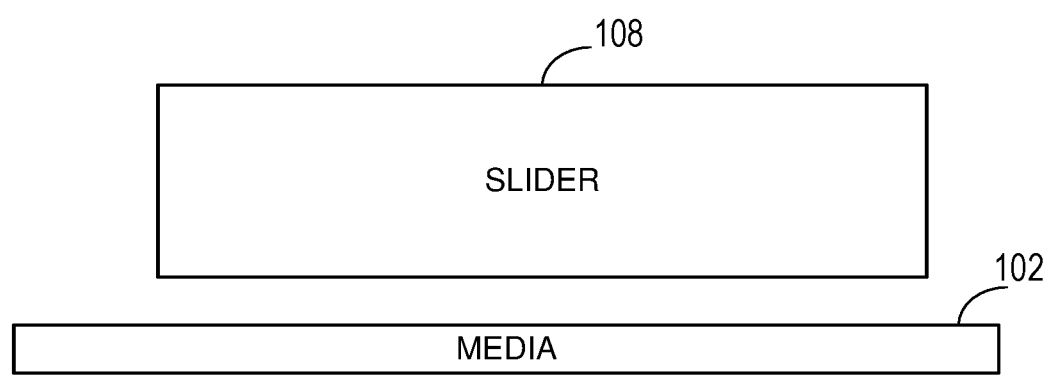
FIG. 2 is a side cross sectional schematic view of selected components of the magnetic recording system of FIG. 1 including the magnetic medium with the magnetic recording layer structure having multiple non-magnetic exchange control sublayers in accordance with one embodiment of the disclosure.

FIG. 2 is a side cross sectional schematic view of selected components of the magnetic recording system of FIG. 1 including the magnetic medium 102 with the magnetic recording layer structure in accordance with one embodiment of the disclosure. The head/slider 108 is positioned above the medium 102. The head/slider 108 includes a write element and a read element (not shown) positioned along an air bearing surface (ABS) of the slider (e.g., bottom surface) for writing information to, and reading information from, respectively, the medium 102. FIGS. 1 and 2 illustrate a specific example of a magnetic recording system. In other examples, embodiments of the improved media with the magnetic recording layer structure disclosed herein can be used in other suitable magnetic systems. For example, the magnetic media of various embodiments disclosed herein may be flexible media in the form a magnetic tape used in a tape-based data storage drive/system. For simplicity of description the various embodiments are primarily described in the context of an example HDD magnetic recording system.

Figure 3:
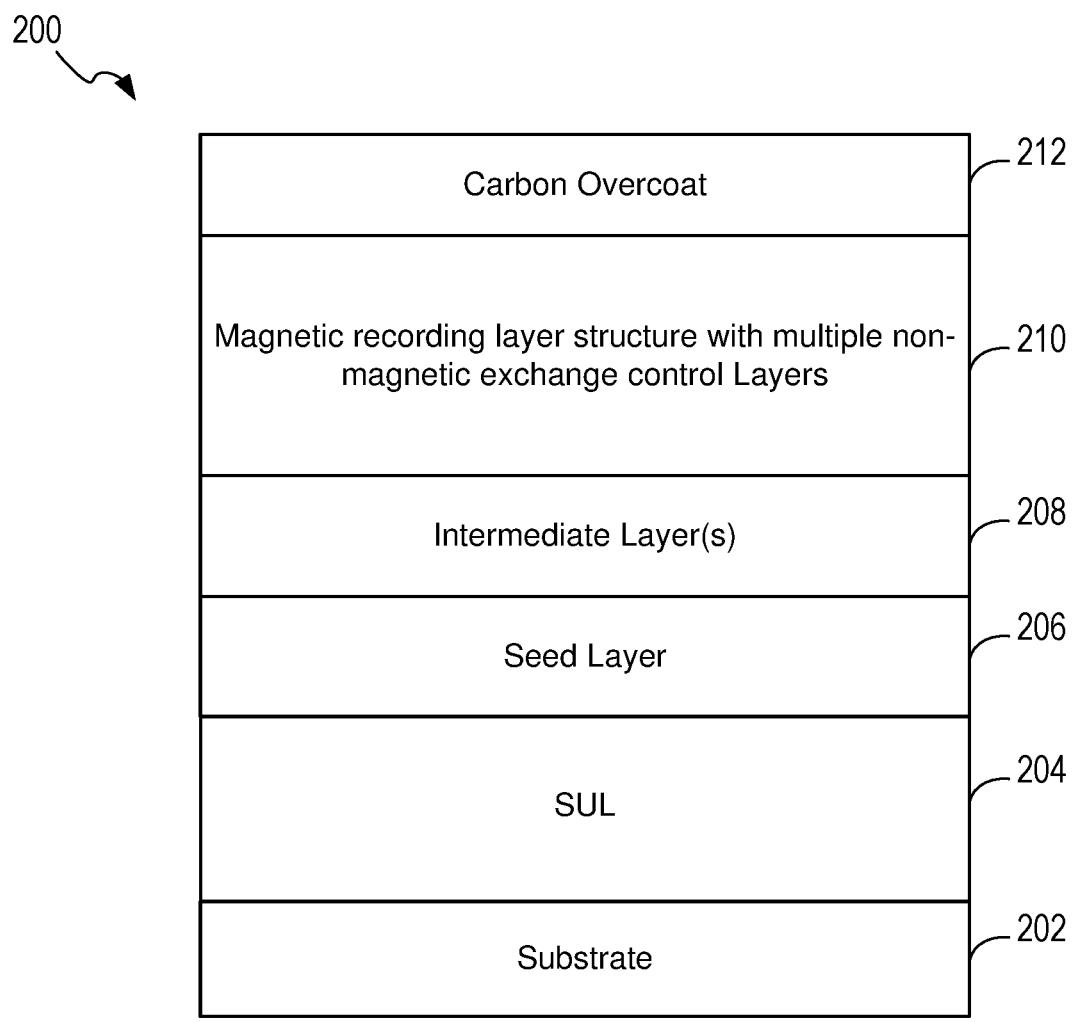
FIG. 3 is a side cross sectional view of a magnetic medium having a magnetic recording layer structure with multiple non-magnetic exchange control sublayers in accordance with one embodiment of the disclosure.

FIG. 3 is a side cross sectional view of a magnetic medium 200 having a magnetic recording layer structure 210 including six magnetic recording sublayers interleaved with six non-magnetic exchange control sublayers in accordance with one embodiment of the disclosure. In particular embodiments, the magnetic medium 200 can be used in conjunction with the disk drive 100 of FIGS. 1 and 2, or a magnetic tape drive. In sequence from the bottom, the medium 200 includes a substrate 202, a soft magnetic underlayer 204, a seed layer 206, one or more optional intermediate layers 208, the magnetic recording layer structure 210, and an overcoat layer 212.

In one or more embodiments for HDD applications, the substrate 202 can be made of one or more materials such as an Al alloy, NiP plated Al, glass, glass ceramic, and/or combinations thereof. In one embodiment, the substrate 202 is a glass substrate having a diameter of about 97 millimeters or less. In other embodiments, the diameter may vary. In one or more embodiments for magnetic tape recording applications, the substrate 202 can include a flexible material, such a film made of one of various types of resins, polyesters, polyolefins, polyamides, and the like, or combinations thereof. The substrate may include non-magnetic materials, and may be laminated.

The soft magnetic underlayer 204 can be made of one or more materials, such as cobalt, iron, molybdenum, tantalum, niobium, boron, chromium, or other soft magnetic material, or combinations thereof. In one aspect, the soft magnetic underlayer 204 may include two soft magnetic underlayers separated by an anti-ferromagnetic coupling (AFC) layer, such as ruthenium (Ru) or other AFC material. The soft magnetic underlayer 204 may be configured to support magnetization of the magnetic recording layer structure 210 during data storage operations.

The seed layer 206 can be made of one or more materials, such as those containing elements of Ni, W, Fe, Cr, Al, combinations thereof, and/or other suitable materials known in the art. The one or more optional intermediate layers 208 can be made of one or more materials, such as those containing elements of Co, Cr, Ru, and/or other suitable materials known in the art. The overcoat layer 212 can be made of one or more materials, such as C and/or other suitable materials known in the art.

In one embodiment, the medium 200 may also include a lubricant layer on the overcoat 212. In such case, the lubricant layer can be made of one or more materials such as a polymer based lubricant and/or other suitable materials known in the art.

Figure 4:
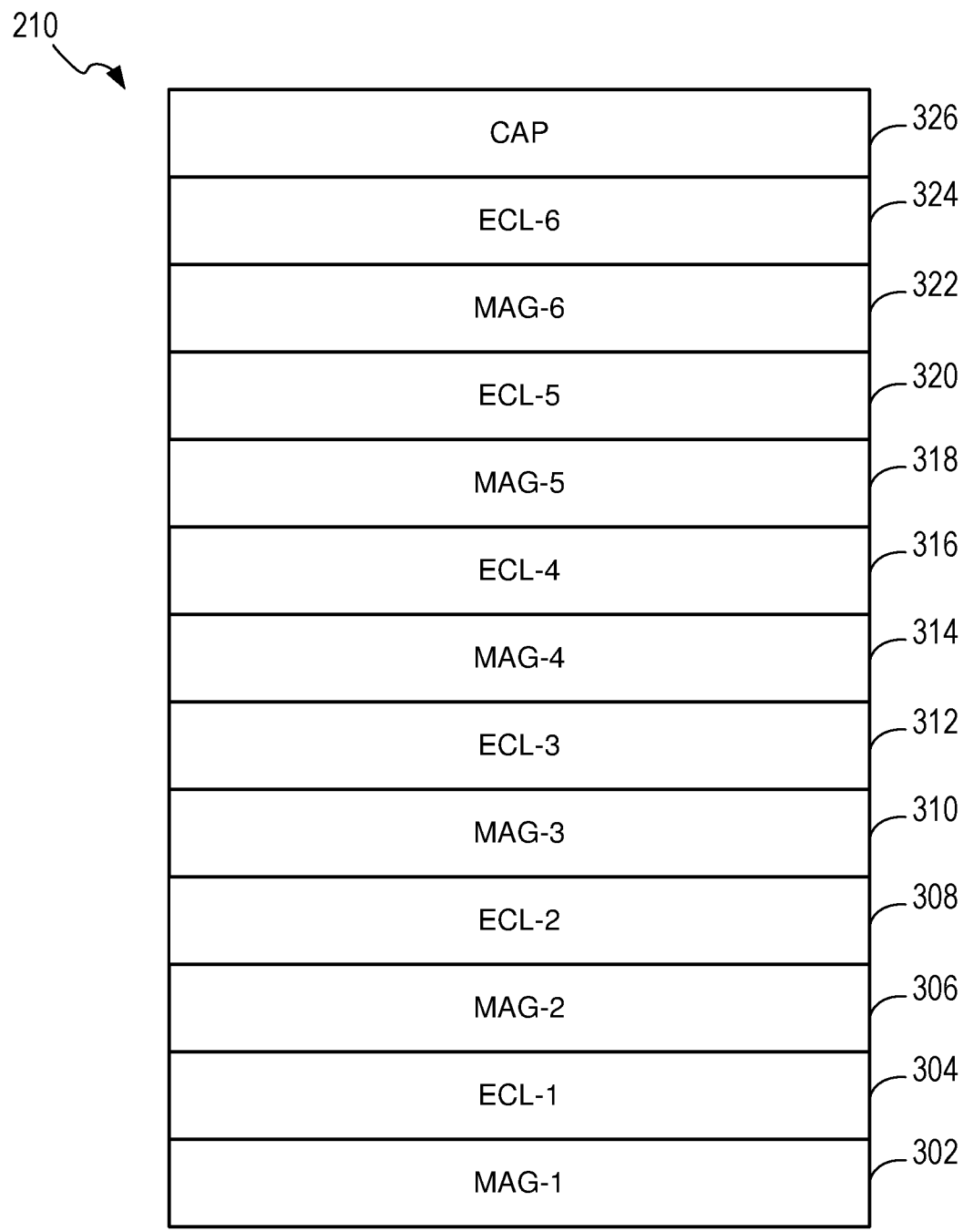
FIG. 4 is a side cross sectional view of a magnetic recording layer structure having six magnetic recording sublayers and six non-magnetic exchange control sublayers in accordance with one embodiment of the disclosure.

FIG. 4 is a side cross sectional view of the magnetic recording layer structure 210 in accordance with one embodiment of the disclosure. The magnetic recording layer structure 210 includes six magnetic recording sublayers 302, 306, 310, 314, 318, and 322 (denoted MAG-1, MAG-2, MAG-3, MAG-4, MAG-5, and MAG-6) and six non-magnetic exchange control sublayers 304, 308, 312, 316, 320, and 324 (denoted ECL-1, ECL-2, ECL-3, ECL-4, ECL-5, and ECL-6) arranged in an alternating pattern. In the example shown in FIG. 4, MAG-1 is the bottom magnetic recording sublayer (e.g., the magnetic recording sublayer nearest the substrate, shown in FIG. 3), while MAG-6 is the top magnetic recording sublayer (e.g., the magnetic recording sublayer farthest from the substrate, shown in FIG. 3).

Each of the magnetic recording sublayers 302, 306, 310, 314, 318, and 322 can be made of one or more magnetic materials, such as CoPt and/or CoCrPt, or other magnetic materials suitable for storing information magnetically. In some examples, each of the magnetic recording sublayers 302, 306, 310, 314, 318, and 322 is made of a cobalt alloy including platinum. In addition, one or more of the magnetic recording sublayers 302, 306, 310, 314, 318, and 322 may further include one or more additional materials, such as those containing elements of Cr, B, Ru, and/or combinations thereof.

In one aspect, each of the magnetic recording sublayers 302, 306, 310, 314, 318, and 322 includes magnetic grains (e.g., made of a cobalt alloy including platinum, such as CoPt and/or CoCrPt) embedded within a mixture of one or more oxide segregants. Suitable oxide segregants may include, but are not limited to, $SiO_2$, $TiO_2$, $Cr_2O_3$, $B_2O_3$, CoO, $Co_3O_4$, and/or combinations thereof. In some examples, the top magnetic recording sublayer 322 (MAG-6) may include at least the oxide segregant of $TiO_2$.

Each of the non-magnetic exchange control sublayers 304, 308, 312, 316, 320, and 324 can be made of one or more materials, such as CoRu and/or CoRuCr with an oxide segregant, such as $TiO_2$, or other suitable non-magnetic material.

In one embodiment, the magnetic recording layer structure 210 may also include a capping layer 326. In such case, the capping layer can be made of one or more materials such as Co, Pt, Cr, B, combinations thereof, and/or other suitable materials known in the art.

To increase the ADC, while improving the media SNR, the magnetic recording layer structure 210 may include a gradient of platinum across the magnetic recording sublayers 302, 306, 310, 314, 318, and 322. In some examples, the bottom magnetic recording sublayer (MAG-1) 302 may include the highest platinum content from among the magnetic recording sublayers, while the top magnetic recording sublayer (MAG-6) 322 may include the lowest platinum content from among the magnetic recording sublayers. For example, MAG-6 may include a platinum content between about twelve and eighteen atomic percent, while MAG-1 may include a platinum content between about nineteen and twenty-four atomic percent. As used herein, the term "about" refers to a deviation of up to five percent.

In addition, each additional magnetic recording sublayer 306, 310, 314, and 318 between MAG-1 and MAG-6 may include a platinum content between MAG-1 and MAG-6 that is equal to or less than the platinum content of the next-lower adjacent magnetic recording sublayer. For example, MAG-5 may have a platinum content greater than MAG-6, but equal to or less than the platinum content of MAG-4, MAG-4 may have a platinum content equal to or less than the platinum content of MAG-3, and so on. In one aspect, MAG-2 may have a platinum content less than MAG-1, but greater than MAG-3. In another aspect, MAG-2 and MAG-3 may each have an equal platinum content that is less than MAG-1, but greater than MAG-4.

Platinum content is a key factor in determining the magnetic anisotropy, Ku, of the alloy. A higher Pt content leads to higher Ku. Thus, by utilizing a gradient of platinum content across the magnetic recording sublayers 302, 306, 310, 314, 318, and 322, a Ku gradient may also be achieved, with each of the magnetic recording sublayers having a Ku equal to or less than the next-lower adjacent magnetic recording sublayer.

In addition, by utilizing a platinum content of between about 12%-18% in the top magnetic recording sublayer 322 (MAG-6) and a platinum content of between about 19%-24% in the bottom magnetic recording sublayer 302 (MAG-1), the Ku of the MAG-1 and MAG-6 alloys may be optimized, thus enabling the respective thicknesses of the intermediate magnetic recording sublayers (e.g., MAG-2 through MAG-5) to be reduced (e.g., by approximately 70%) in comparison to the top and bottom magnetic recording sublayers (e.g., MAG-1 and MAG-6). In one example, the thickness of the MAG-1 and MAG-6 sublayers may be between about twenty and fifty angstroms, whereas the thickness of the intermediate magnetic recording sublayers (e.g., MAG-2 through MAG-5) may be between about two and twenty angstroms.

As a result of the reduction in total thickness of MAG-1 through MAG-6, the resolution of the recording media may be improved. The higher Ku of the MAG-6 sublayer may also allow the use of thicker ECL sublayers, which reduces vertical magnetic coupling, thus improving SNR. The resulting magnetic recording layer structure 210 of the six ECL design shown in FIG. 4 may give rise to more than 0.5 dB $SNR_{2T}$ and $SNR_{1T}$ gain over five ECL designs, which translates to an increase of 1.92 and 1.77% figure of merit (FOM) (correlated to areal density capacity) respectively, at MD (mid radius) an OD (outer radius).

Figure 5:
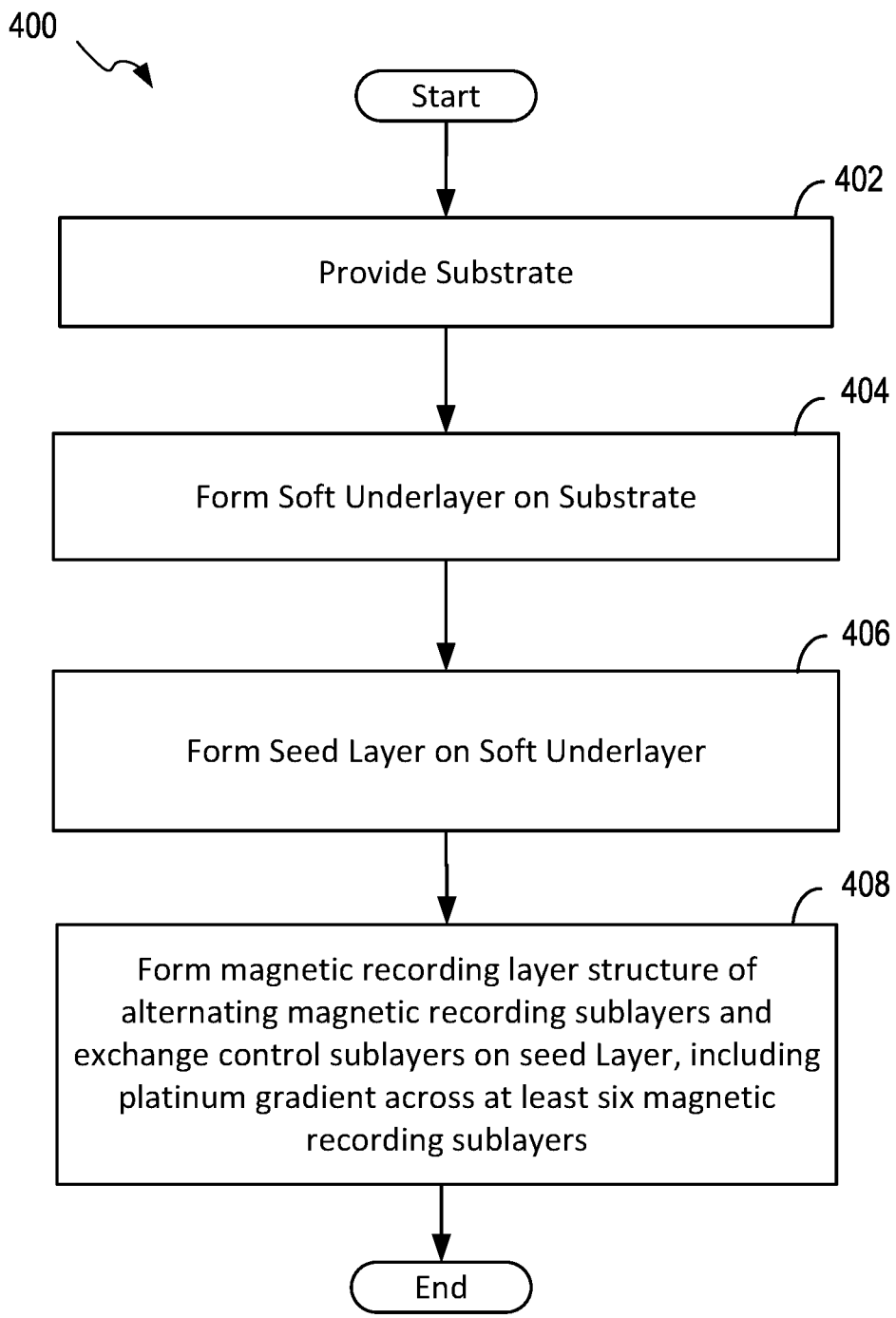
FIG. 5 is a flowchart of a process for fabricating a magnetic medium including a magnetic recording layer structure having at least six magnetic recording sublayers and at least six non-magnetic exchange control sublayers in accordance with one embodiment of the disclosure.

FIG. 5 is a flowchart of a process 400 for fabricating a magnetic medium including a magnetic recording layer structure having at least six magnetic recording sublayers and at least six non-magnetic exchange control sublayers in accordance with one embodiment of the disclosure. In particular embodiments, the process 400 can be used to fabricate the magnetic medium described above including medium 200 and/or medium 102. At block 402, the process provides a substrate. At block 404, a soft underlayer (e.g., SUL 204 in FIG. 3) is formed on the substrate. At block 406, a seed layer (e.g., seed layer 206 in FIG. 3) is formed on the SUL. In addition, one or more optional intermediate layers (e.g., intermediate layer(s) 208 in FIG. 3) may also be formed on the seed layer.

At block 408, a magnetic recording layer structure of alternating magnetic recording sublayers and non-magnetic exchange control sublayers is formed on the seed layer. In an aspect, at least six magnetic recording sublayers and at least six exchange control sublayers are included in the magnetic recording layer structure. For example, a first or bottom magnetic recording sublayer may be formed on the seed layer, a first exchange control sublayer may be formed on the first magnetic recording sublayer, a second magnetic recording sublayer may be formed on the first exchange control sublayer, a second exchange control sublayer may be formed on the second magnetic recording sublayer, a third magnetic recording sublayer may be formed on the second exchange control sublayer, a third exchange control sublayer may be formed on the third magnetic recording sublayer, a fourth magnetic recording sublayer may be formed on the third exchange control sublayer, a fourth exchange control sublayer may be formed on the fourth magnetic recording sublayer, a fifth magnetic recording sublayer may be formed on the fourth exchange control sublayer, a fifth exchange control sublayer may be formed on the fifth magnetic recording sublayer, a sixth magnetic recording sublayer may be formed on the fifth exchange control sublayer, and a sixth exchange control sublayer may be formed on the sixth magnetic recording sublayer. In some examples, a capping layer (e.g., non-oxide containing recording layer) may be formed on the sixth exchange control sublayer.

Each of the magnetic recording sublayers includes oxide-containing magnetic materials (e.g., made of a cobalt alloy including platinum, such as CoPt and/or CoCrPt together with one or more oxide segregants, including, but not limited to, $SiO_2$, $TiO_2$, $Cr_2O_3$, $B_2O_3$, CoO, $Co_3O_4$, and/or combinations thereof). Each of the non-magnetic exchange control sublayers can be made of one or more materials, such as CoRu and/or CoRuCr with an oxide segregant, such as $TiO_2$, or other suitable non-magnetic material.

The magnetic recording layer structure is further formed such that a gradient of platinum is present across the magnetic recording sublayers. In some examples, the bottom magnetic recording sublayer may include the highest platinum content from among the magnetic recording sublayers, while the top magnetic recording sublayer may include the lowest platinum content from among the magnetic recording sublayers. For example, the top magnetic recording sublayer may include a platinum content between about twelve and eighteen atomic percent, while the bottom magnetic recording sublayer may include a platinum content between about nineteen and twenty-four atomic percent. Each additional magnetic recording sublayer between the top and bottom magnetic recording sublayers may include a platinum content between the highest and lowest platinum contents that is equal to or less than the platinum content of the next-lower adjacent magnetic recording sublayer.

In addition, the thickness of the top and bottom magnetic recording sublayers may be larger than the thickness of the intermediate magnetic recording sublayers. For example, the thickness of the top and bottom magnetic recording sublayers may be between twenty and fifty angstroms, while the thickness of the additional intermediate magnetic recording sublayers may be between two and twenty angstroms.

In one aspect, the soft underlayer and seed layer are deposited at an ambient room temperature (e.g., without applying heat prior to or during deposition). In one aspect, the magnetic recording layer structure may be deposited at a temperature of about 150 degrees Celsius, or a temperature in the range from 50 to 340 degrees Celsius.

In one embodiment, the process can perform the sequence of actions in a different order. In another embodiment, the process can skip one or more of the actions. In other embodiments, one or more of the actions are performed simultaneously. In some embodiments, additional actions can be performed. For example, in one aspect, the process may include any additional actions needed to fabricate the magnetic layer structure of the media 200 of FIG. 3.

In several embodiments, the forming or deposition of such layers can be performed using a variety of deposition sub-processes, including, but not limited to physical vapor deposition (PVD), direct current (DC) sputter deposition, ion beam deposition, radio frequency sputter deposition, or chemical vapor deposition (CVD), including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

Magnetic Media with Graded Dual Layer Magnetic Recording Sublayers

Turning now to FIGS. 6-12, exemplary embodiments will be described wherein, in some aspects, one or more magnetic recording sublayers of the magnetic media have at least two films graded relative to one another (and, in some examples, relative to other sublayers). The grading within a particular magnetic recording sublayer may be controlled, for example, to provide different levels of Ku and Ms within the sublayer. In some examples, variations in Ku are achieved by forming films using different alloys that have different concentrations of Pt. For instance, a first film that is closer to the substrate may have a higher Pt concentration than a second film farther from the substrate. In some examples, variations in both Ku and Ms are achieved by forming films using different alloys that have different concentrations of Ru. For instance, a first film that is closer to the substrate may have a lower Ru concentration than a second film farther from the substrate. Additionally or alternatively, the concentrations and types of oxide segregants may vary from one film to another within the sublayer. For example, a first film may have a higher concentration of oxide segregants (including, but not limited to one or more of $TiO_2$, $B_2O_3$, $SiO_2$, $Cr_2O_3$, MnO, CoO, etc.) than a second film. In some aspects, the higher concentration of oxide segregants in the first film relative to the second film provides for a gradient across the sublayer in intergranular magnetic exchange coupling that may improve ADC.

Herein, the term film is used to refer to a layer of a sublayer, but other terms might be used instead of film such as stratum, lamina, layer, sublayer, sub-sublayer, or sheet. In some of the examples herein, each film may have different characteristics from other films, sublayers, or layers. Typically, the films are thin but the term should not be taken as implying any particular amount of thickness. In some examples discussed below, an individual film of one particular sublayer may be thicker than an entire one of the other sublayers. Moreover, the term film should not be taken to imply that the film is a coating on top of the media. Rather, in many examples, the films may be portions of sublayers that are in the middle of a vertical media structure.

Providing two films within a particular magnetic recording sublayer that have different Ku, Ms, or segregant characteristics is referred to herein as providing a "dual layer" structure. By forming a magnetic recording sublayer using films with different characteristics, such as different Pt or Ru concentrations, the Ku and/or Ms characteristics are thereby graded from one film to another, thereby providing a gradient in Ku and/or Ms within and across the magnetic recording sublayer. This can achieve increased media resolution (Res), leading to improvements in ADC and other parameters. Note that each individual film of the magnetic recording sublayer may be formed of a uniform alloy. That is, the individual films need not exhibit a gradient within the film itself. Rather the gradient is achieved by using different alloys to form the different films of the magnetic recording sublayer, thus achieving a variation in Ku and/or Ms characteristics across the magnetic recording sublayer.

In some examples, a single one of the magnetic recording sublayers has the dual layer structure. In other examples, two or more of the magnetic recording sublayers have the dual layer structure. Still further, at least one of the magnetic recording sublayers may be provided with three or more films that are graded relative to one another, and so the dual layer structure is not limited herein to just two films. If multiple films (e.g. three or more films) are provided within a sublayer, the platinum content may be formed to have a gradient from higher concentration to lower concentration, with the platinum concentration decreasing in the direction away from the substrate. As a practical matter, however, two films are often sufficient to gain performance benefits. The medium may be, for example, a PMR medium, an SMR medium, or a MAMR medium.

In some examples, six or more of the magnetic recording sublayers are provided in the magnetic media. In other examples, five or fewer magnetic recording sublayers are provided. Notably, therefore, the embodiments of FIGS. 6-12 need not include all of the features of the embodiments of FIGS. 1-5.

Figure 6:
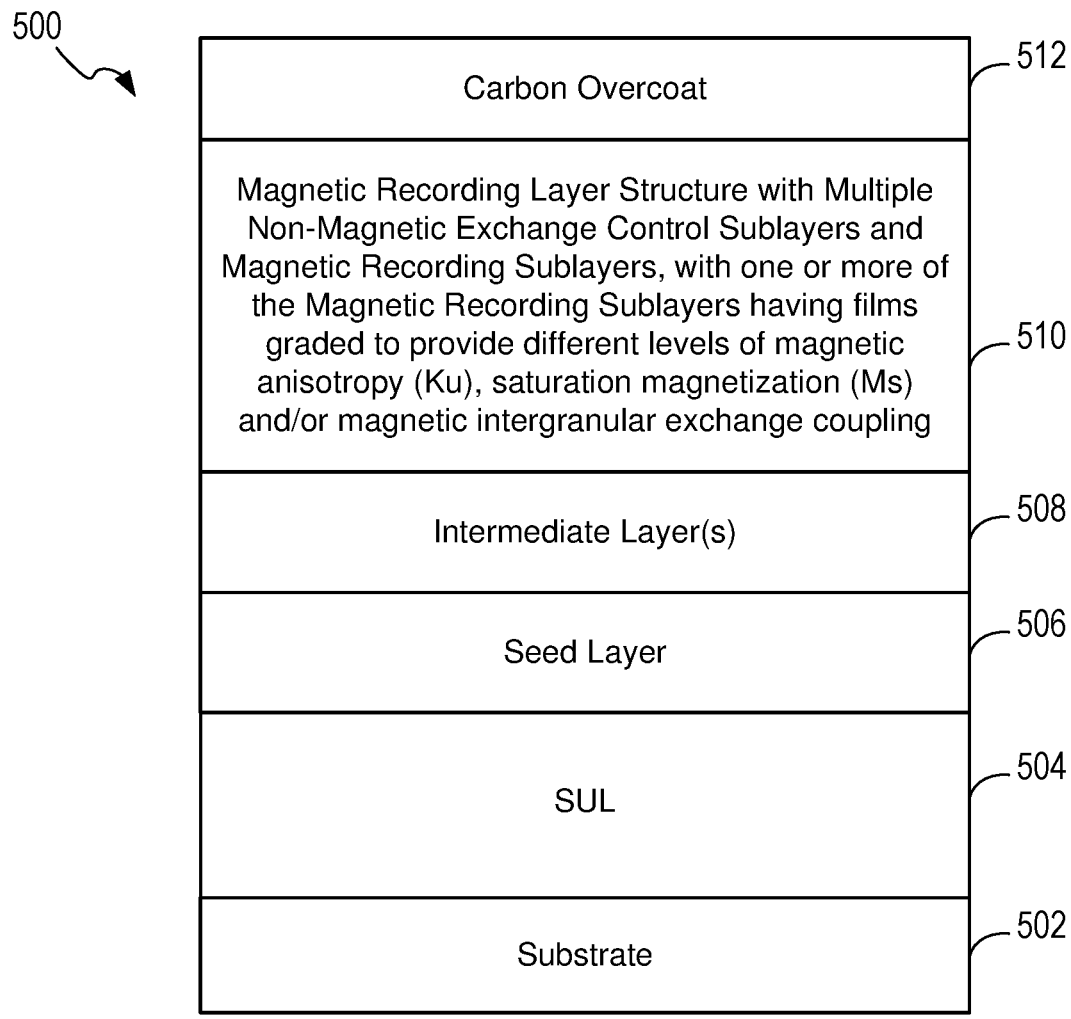
FIG. 6 is a side cross sectional view of a magnetic medium having a magnetic recording layer structure with multiple non-magnetic exchange control sublayers in accordance with one embodiment of the disclosure, with one or more of the magnetic recording sublayers having films graded to provide different levels of Ku, Ms, and/or intergranular magnetic exchange coupling across the sublayer.

FIG. 6 is a side cross sectional view of a magnetic medium 500 having a magnetic recording layer structure 510 including magnetic recording sublayers interleaved with non-magnetic exchange control sublayers and with one or more of the magnetic recording sublayers having two or more films (or sub-sublayers) graded relative to one another to provide different levels of Ku, Ms and/or intergranular magnetic exchange coupling. As noted, in some examples, there are six magnetic recording sublayers and six non-magnetic exchange control sublayers. However, in other examples, more or fewer of the sublayers are provided. For example, five magnetic recording sublayers and five non-magnetic exchange control sublayers may be used in some examples.

In particular embodiments, the magnetic medium 500 having the magnetic recording layer structure 510 can be used in conjunction with the disk drive 100 of FIGS. 1 and 2, or a magnetic tape drive. In sequence from the bottom, the medium 500 includes a substrate 502, a soft magnetic underlayer 504, a seed layer 506, one or more optional intermediate layers 508, the magnetic recording layer structure 510, and an overcoat layer 512. In one or more embodiments for HDD applications, the substrate 502 can be made of one or more materials such as an Al alloy, NiP plated Al, glass, glass ceramic, and/or combinations thereof. In one embodiment, the substrate 502 is a glass substrate having a diameter of about 97 millimeters or less. In other embodiments, the diameter may vary. In one or more embodiments for magnetic tape recording applications, the substrate 502 can include a flexible material, such a film made of one of various types of resins, polyesters, polyolefins, polyamides, and the like, or combinations thereof. The substrate may include non-magnetic materials, and may be laminated.

The soft magnetic underlayer 504 can be made of one or more materials, such as cobalt, iron, molybdenum, tantalum, niobium, boron, chromium, or other soft magnetic material, or combinations thereof. In one aspect, the soft magnetic underlayer 504 may include two soft magnetic underlayers separated by an AFC layer, such as Ru or other AFC material. The soft magnetic underlayer 504 may be configured to support magnetization of the magnetic recording layer structure 510 during data storage operations.

The seed layer 506 can be made of one or more materials, such as those containing elements of Ni, W, Fe, Cr, Al, combinations thereof, and/or other suitable materials known in the art. The one or more optional intermediate layers 508 can be made of one or more materials, such as those containing elements of Co, Cr, Ru, and/or other suitable materials known in the art. In some examples, the intermediate layers 508 include a lower CoRuCr layer and an upper Ru layer. The overcoat layer 512 can be made of one or more materials, such as C and/or other suitable materials known in the art. In one embodiment, the medium 500 may also include a lubricant layer on the overcoat 512. In such cases, the lubricant layer can be made of one or more materials such as a polymer based lubricant and/or other suitable materials known in the art.

Figure 7:
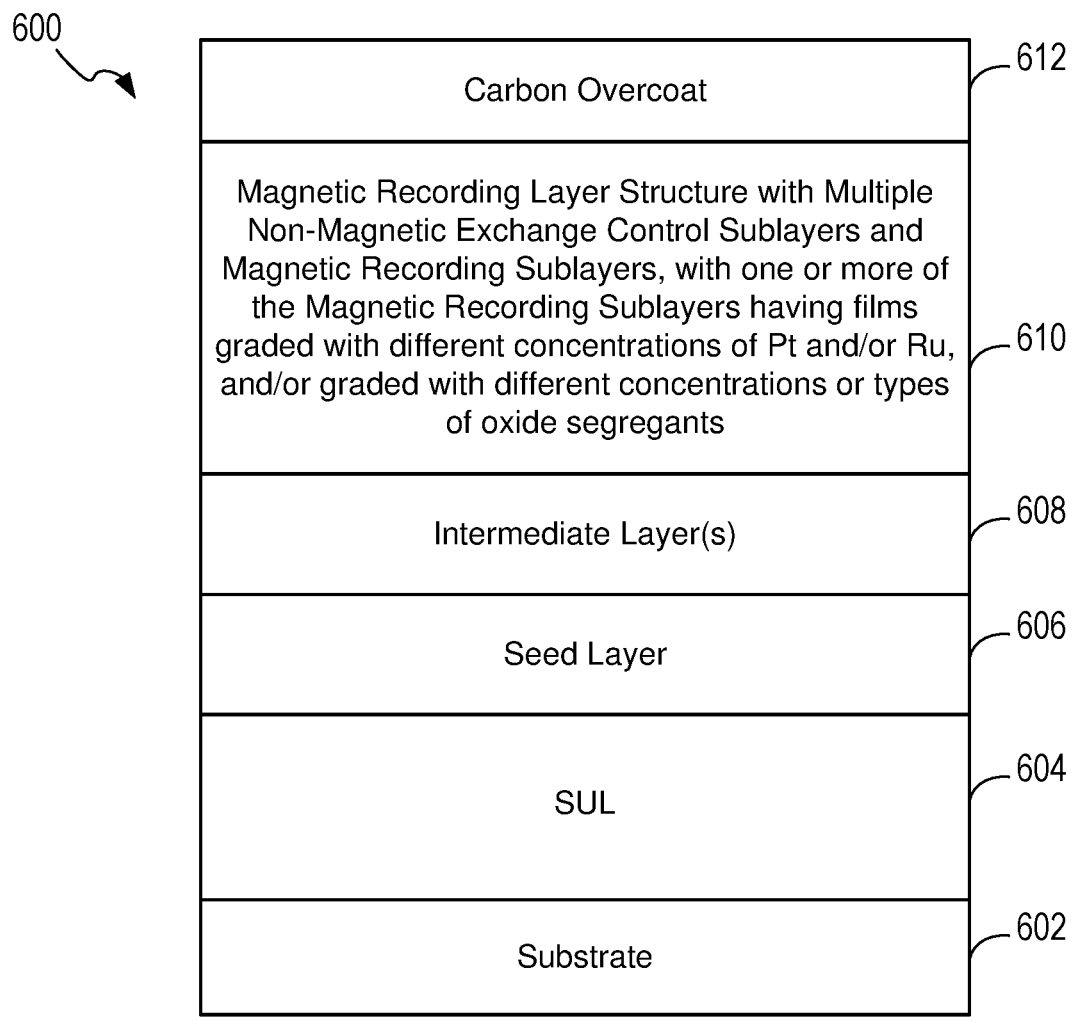
FIG. 7 is a side cross sectional view of a magnetic medium having a magnetic recording layer structure with multiple non-magnetic exchange control sublayers in accordance with one embodiment of the disclosure, with one or more of the magnetic recording sublayers having films graded with different concentrations of Pt, Ru, and/or different concentrations or types of oxide segregants.

FIG. 7 is a side cross sectional view of a magnetic medium 600 having a magnetic recording layer structure 610 including magnetic recording sublayers interleaved with non-magnetic exchange control sublayers with one or more of the magnetic recording sublayers having films graded with different concentrations of Pt, Ru, and/or different concentrations or types of oxide segregants. In some examples, the different films may have the same segregants but provided in different concentrations. In other examples, the different films may have different segregants. As noted above, the grading of the films of the sublayer may be used to achieve or provide different levels of Ku, Ms and/or intergranular magnetic exchange coupling. In some examples, there are six magnetic recording sublayers and six non-magnetic exchange control sublayers. However, in other examples, more or fewer of the sublayers are provided. For example, five magnetic recording sublayers and five non-magnetic ECLs may be used in some examples.

In particular embodiments, the magnetic medium 600 having the magnetic recording layer structure 610 can be used in conjunction with the disk drive 100 of FIGS. 1 and 2, or a magnetic tape drive. In sequence from the bottom, the medium 600 includes a substrate 602, a soft magnetic underlayer 604, a seed layer 606, one or more optional intermediate layers 608, the magnetic recording layer structure 610, and an overcoat layer 612. The one or more optional intermediate layers 608 can be made of one or more materials, such as those containing elements of Co, Cr, Ru, and/or other suitable materials known in the art. In some examples, the intermediate layers 608 include a lower CoRuCr layer and an upper Ru layer. The overcoat layer 612 can be made of one or more materials, such as C and/or other suitable materials known in the art. In one embodiment, the medium 600 may also include a lubricant layer on the overcoat 612. In such cases, the lubricant layer can be made of one or more materials such as a polymer based lubricant and/or other suitable materials known in the art.

Figure 8:
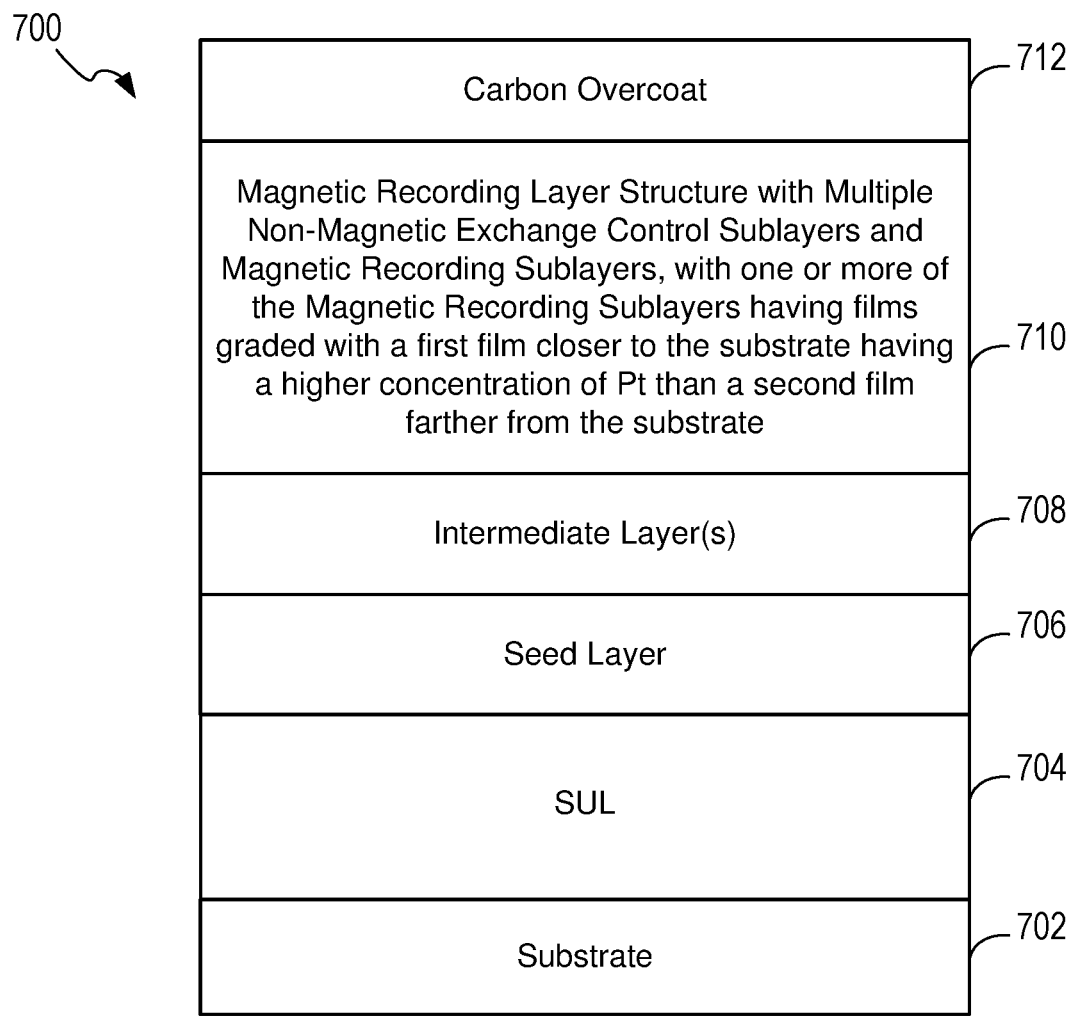
FIG. 8 is a side cross sectional view of a magnetic medium having a magnetic recording layer structure with multiple non-magnetic exchange control sublayers in accordance with one embodiment of the disclosure, with one or more of the magnetic recording sublayers having films graded with a first film closer to the substrate having a higher concentration of Pt than a second film farther from the substrate.

FIG. 8 is a side cross sectional view of a magnetic medium 700 having a magnetic recording layer structure 710 including magnetic recording sublayers interleaved with non-magnetic exchange control sublayers with one or more of the magnetic recording sublayers having films graded with a (first) film closer to the substrate having a higher concentration of Pt than a (second) film farther from the substrate. As noted above, the grading of Pt in the films may be used to achieve or provide different levels of Ku. In some examples, there are six magnetic recording sublayers and six non-magnetic exchange control sublayers. In other examples, more or fewer of the sublayers are provided. For example, five magnetic recording sublayers and five non-magnetic exchange control sublayers may be used in some examples.

In particular embodiments, the magnetic medium 700 having the magnetic recording layer structure 710 can be used in conjunction with the disk drive 100 of FIGS. 1 and 2, or a magnetic tape drive. In sequence from the bottom, the medium 700 includes a substrate 702, a soft magnetic underlayer 704, a seed layer 706, one or more optional intermediate layers 708, the magnetic recording layer structure 710, and an overcoat layer 712. The one or more optional intermediate layers 708 can be made of one or more materials, such as those containing elements of Co, Cr, Ru, and/or other suitable materials known in the art. In some examples, the intermediate layers 708 include a lower CoRuCr layer and an upper Ru layer. The overcoat layer 712 can be made of one or more materials, such as C and/or other suitable materials known in the art. In one embodiment, the medium 700 may also include a lubricant layer on the overcoat 712. In such cases, the lubricant layer can be made of one or more materials such as a polymer based lubricant and/or other suitable materials known in the art.

Figure 9:
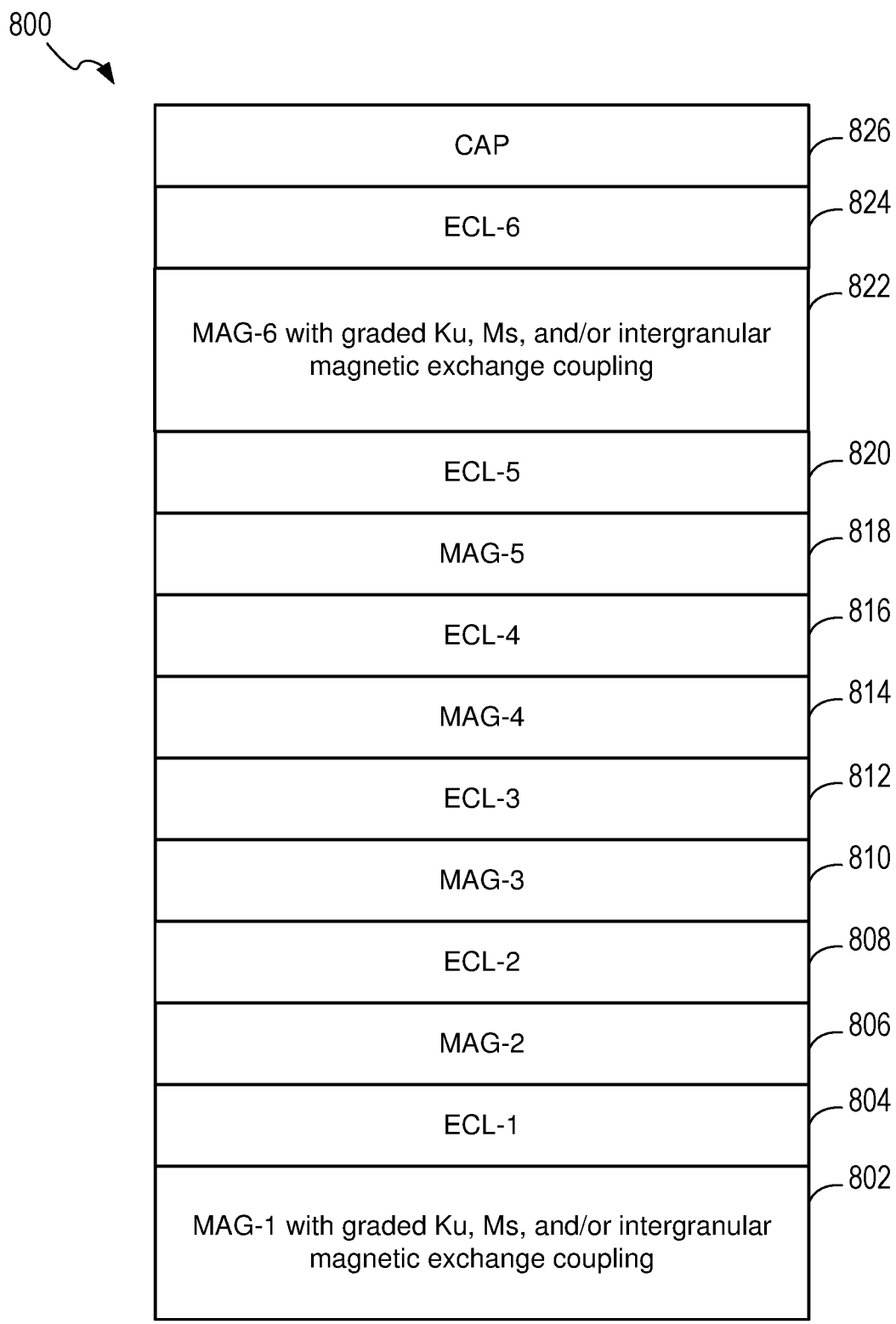
FIG. 9 is a side cross sectional view of a magnetic recording layer structure having magnetic recording sublayers and non-magnetic exchange control sublayers in accordance with one embodiment of the disclosure, wherein two of the magnetic recording sublayers are both graded to provide gradients in Ku, Ms, and/or intergranular magnetic exchange coupling.

FIG. 9 is a side cross sectional view of the magnetic recording layer structure 800 in accordance with one embodiment of the disclosure. The magnetic recording layer structure 800 includes six magnetic recording sublayers 802, 806, 810, 814, 818, and 822 (denoted MAG-1, MAG-2, MAG-3, MAG-4, MAG-5, and MAG-6) and six non-magnetic exchange control sublayers 804, 808, 812, 816, 820, and 824 (denoted ECL-1, ECL-2, ECL-3, ECL-4, ECL-5, and ECL-6) arranged in an alternating pattern. In the example of FIG. 9, MAG-1 is the bottom magnetic recording sublayer (e.g., the magnetic recording sublayer nearest the substrate that is shown in FIGS. 6-8), while MAG-6 is the top magnetic recording sublayer (e.g., the magnetic recording sublayer farthest from the substrate that is shown in FIGS. 6-8).

In the example of FIG. 9, MAG-1 sublayer 802 and MAG-6 sublayer 822 are both configured with graded Ku, Ms, and/or intergranular magnetic exchange coupling. In some examples, as already explained, a sublayer may be graded by forming the sublayer using two or more films (or sub-sublayers) with different concentrations of Pt, Ru, and/or different concentrations of oxide segregants as indicated in FIGS. 6-8. That is, although not specifically shown in FIG. 9, MAG-1 sublayer 802 may be formed of two or more films with different Pt concentrations, and/or Ru concentrations, and/or different concentrations or types of oxide segregants, and MAG-6 sublayer 822 also may be formed of two or more films with different Pt and/or Ru concentrations and/or different concentrations or types of oxide segregants. That is, there can be one or more "intra-sublayer" gradients of Ku, Ms, and/or intergranular magnetic exchange coupling that extend within particular sublayers, such as within sublayer 802 and within sublayer 822.

Each of the other magnetic recording sublayers 802, 806, 810, 814, 818, and 822 can be made of one or more magnetic materials, such as CoPt and/or CoCrPt, or other magnetic materials suitable for storing information magnetically. In some examples, each of the magnetic recording sublayers 802, 806, 810, 814, 818, and 822 is made of a cobalt alloy including platinum. In addition, one or more of the magnetic recording sublayers 802, 806, 810, 814, 818, and 822 may further include one or more additional materials, such as those containing elements of Cr, B, Ru, and/or combinations thereof. In one aspect, each of the magnetic recording sublayers 802, 806, 810, 814, 818, and 822 includes magnetic grains (e.g., made of a cobalt alloy including platinum, such as CoPt and/or CoCrPt) embedded within a mixture of one or more oxide segregants. Suitable oxide segregants may include, but are not limited to, $SiO_2$, $TiO_2$, $Cr_2O_3$, $B_2O_3$, MnO, CoO, $Co_3O_4$, and/or combinations thereof. In some examples, the top magnetic recording sublayer 822 (MAG-6) may include at least the oxide segregant of $TiO_2$. Each of the non-magnetic exchange control sublayers 804, 808, 812, 816, 820, and 824 can be made of one or more materials, such as CoRu and/or CoRuCr with an oxide segregant, such as $TiO_2$, or other suitable non-magnetic material.

In one embodiment, the magnetic recording layer structure 800 may also include a capping layer 826. In such case, the capping layer can be made of one or more materials such as Co, Pt, Cr, B, combinations thereof, and/or other suitable materials known in the art. In embodiments where there is no capping layer, ECL-6 824 may be omitted. Hence, embodiments may be provided with 6 MAG layers and 5 ECLs.

In addition to the intra-sublayer gradients provided within sublayers 802 and 822, to further increase the ADC while improving the media SNR, the magnetic recording layer structure 800 may include an "inter-sublayer" gradient of platinum across the various magnetic recording sublayers 802, 806, 810, 814, 818, and 822 (see, again, FIGS. 1-5 and their descriptions above). The inter-sublayer gradient that extends across the various sublayers of structure 800 from sublayer 802 to sublayer 822 may be achieved by providing different Pt concentrations within each of the sublayers 802, 806, 810, 814, 818, and 822.

In some media designs with multilayer MRLs, one of the sublayers may be responsible for all or most of the actual recording/storing of the data, while the other sublayers assist in recording to that layer. Hence, in some examples, one of the graded "dual layers," such as MAG-6 822, may provide for most of the actual recording/storing of the data, with the various other sublayers assisting in the recording. By providing a gradient within the particular sublayer that accounts for most or all of the actual recording/storing of the data, improvements in recording/storing can be achieved. In other examples, one of the graded "dual layers," such as MAG-1 802, may provide for most of the actual recording/storing of the data. In further examples, two graded "dual layers," such as MAG-6 822 and MAG-1 802, may provide for most of the actual recording/storing of the data.

Figure 10:
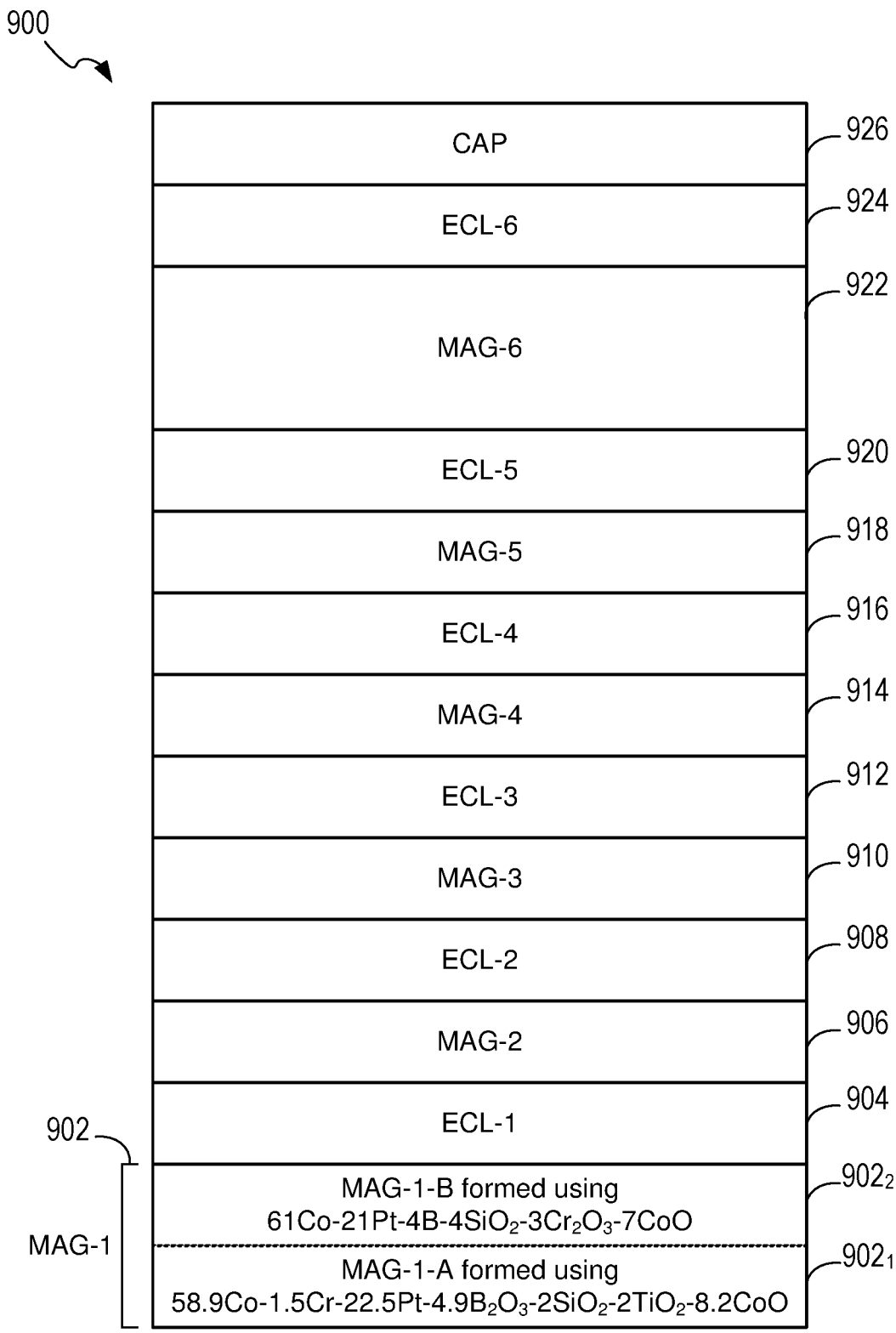
FIG. 10 is a side cross sectional view of a magnetic recording layer structure having magnetic recording sublayers and non-magnetic exchange control sublayers in accordance with another embodiment of the disclosure, wherein a lowermost magnetic recording sublayer is formed with graded Pt concentrations and with at least some differing oxide segregants and oxide segregant concentrations.

FIG. 10 is a side cross sectional view of the magnetic recording layer structure 900 in accordance with another embodiment of the disclosure. The magnetic recording layer structure 900 includes six magnetic recording sublayers 902, 906, 910, 914, 918, and 922 (denoted MAG-1, MAG-2, MAG-3, MAG-4, MAG-5, and MAG-6) and six non-magnetic exchange control sublayers 904, 908, 912, 916, 920, and 924 (denoted ECL-1, ECL-2, ECL-3, ECL-4, ECL-5, and ECL-6) arranged in an alternating pattern. In the example of FIG. 10, MAG-1 sublayer 900 includes two films (or sub-sublayers) MAG-1-A $902_1$ and MAG-1-B $902_2$, described in more detail below. In the example of FIG. 10, MAG-1 902 is the bottom magnetic recording sublayer (e.g., the magnetic recording sublayer nearest the substrate that is shown in FIGS. 6-8), while MAG-6 922 is the top magnetic recording sublayer (e.g., the magnetic recording sublayer farthest from the substrate that is shown in FIGS. 6-8).

In the example of FIG. 10, MAG-1 sublayer 902 is configured with different concentrations of Pt (as well as other differing constituents) within the two component films, MAG-1-A $902_1$ and MAG-1-B $902_2$, thus providing an intra-sublayer gradient in Ku and Ms within the MAG-1 sublayer 902. In the particular example of FIG. 10, MAG-1-A $902_1$ is formed using 58.9Co-1.5Cr-22.5Pt-4.9$B_2O_3$-2$SiO_2$-2$TiO_2$-8.2CoO and MAG-1-B $902_2$ is formed using 61Co-21Pt-4B-4$SiO_2$-3$Cr_2O_3$-7CoO (where the numerical values in the formulae, e.g. 58.9, 1.5, and 22.5, etc., are concentrations represented as atomic percentages in the case of elements and molecular percentages in the case of oxides). That is, the Pt concentration of MAG-1-A $902_1$ is higher than or greater than the Pt concentration of MAG-1-B $902_2$. (Note that these exemplary formulas are for sputter target materials, and hence may not reflect the precise resulting deposition material structure.) The exemplary values shown in FIG. 10 are merely illustrative and can be varied within appropriate ranges consistent with the teachings herein. For example, the Pt concentration value of MAG-1-A may differ from 22.5% (atomic percentage) and may be, for example, in the range of 21% to 24%. The Pt concentration value of MAG-1-B may differ from 21% (atomic percentage) and may be, for example, in the range of 19% to 22%. As already explained, the Pt concentration of MAG-1-B should be lower than that of MAG-1-A.

Each of the other magnetic recording sublayers 906, 910, 914, 918, and 922 can be made of one or more magnetic materials, such as CoPt and/or CoCrPt, or other magnetic materials suitable for storing information magnetically. In some examples, each of the magnetic recording sublayers 906, 910, 914, 918, and 922 is made of a cobalt alloy including platinum. In addition, one or more of the magnetic recording sublayers 906, 910, 914, 918, and 922 may further include one or more additional materials, such as those containing elements of Cr, B, Ru, and/or combinations thereof. In one aspect, each of the magnetic recording sublayers 906, 910, 914, 918, and 922 includes magnetic grains (e.g., made of a cobalt alloy including platinum, such as CoPt and/or CoCrPt) embedded within a mixture of one or more oxide segregants. Suitable oxide segregants may include, but are not limited to, $SiO_2$, $TiO_2$, $Cr_2O_3$, $B_2O_3$, MnO, CoO, $Co_3O_4$, and/or combinations thereof. In some examples, the top magnetic recording sublayer 922 (MAG-6) may include at least the oxide segregant of $TiO_2$. Each of the non-magnetic exchange control sublayers 904, 908, 912, 916, 920, and 924 can be made of one or more materials, such as CoRu and/or CoRuCr with an oxide segregant, such as $TiO_2$, or other suitable non-magnetic material. In one embodiment, the magnetic recording layer structure 900 may also include a capping layer 926. In such case, the capping layer can be made of one or more materials such as Co, Pt, Cr, B, combinations thereof, and/or other suitable materials known in the art.

In addition to the intra-sublayer gradient provided within sublayer 902, to further increase the ADC, while improving the media SNR, the magnetic recording layer structure 900 may include an inter-sublayer gradient of platinum across the various magnetic recording sublayers 902, 906, 910, 914, 918, and 922, as already explained.

Table I illustrates sublayer thicknesses for an illustrative and non-limiting example. Note that, in the example of Table I, the grain initiation isolation layer (GIIL), the Ru layer, and CoRuCr layers formed above the magnetic seed layer and beneath MAG-1-A correspond to the intermediate layers 508, 608 or 708 of FIG. 6, 7, or 8. The particular numerical designations or names of the various sublayers are, of course, arbitrary. In some examples, the magnetic recording sublayer nearest to the substrate may be referred to as a first or bottommost magnetic recording sublayer and the magnetic recording sublayer farthest from the substrate may be referred to as a second or topmost magnetic recording sublayer, with the various magnetic recording sublayers positioned therebetween referred to as intermediate magnetic recording sublayers. In some examples, as shown in Table I, the topmost and bottommost magnetic recording sublayers are both thicker than each of intermediate magnetic recording sublayers. For example, the topmost and bottommost magnetic recording sublayers both may be at least 20 angstroms thick, whereas each of intermediate magnetic recording sublayers are less than 20 angstroms thick. In another example, the topmost and bottommost magnetic recording sublayers both may be at least 25 angstroms thick, whereas each of intermediate magnetic recording sublayers are less than 15 angstroms thick. Note also that one film of a sublayer may have a higher total concentration of all oxides than a total concentration of all oxides of the other film of the sublayer. Moreover, one film may include a first type of oxide segregant and the second film may include at least a second, different type of oxide segregant.

TABLE I

| SUBLAYER | THICKNESS (angstroms) |
| --- | --- |
| CAP | 11 |
| ECL-6 | 18 |
| MAG-6 | 25 |
| ECL-5 | 12 |
| MAG-5 | 6 |
| ECL-4 | 7 |
| MAG-4 | 4 |
| ECL-3 | 4 |
| MAG-3 | 4 |
| ECL-2 | 7 |
| MAG-2 | 12 |
| ECL-1 | 6 |
| MAG-1 including MAG-1-B and MAG-1-A | 31 |
| GIIL | 19 |
| Ru | 110 |
| CoRuCr | 37 |
| Mag Seed | 30 |
| SUL | 65 |
| AF-coupling | 7 |
| SUL | 65 |

Figure 11:
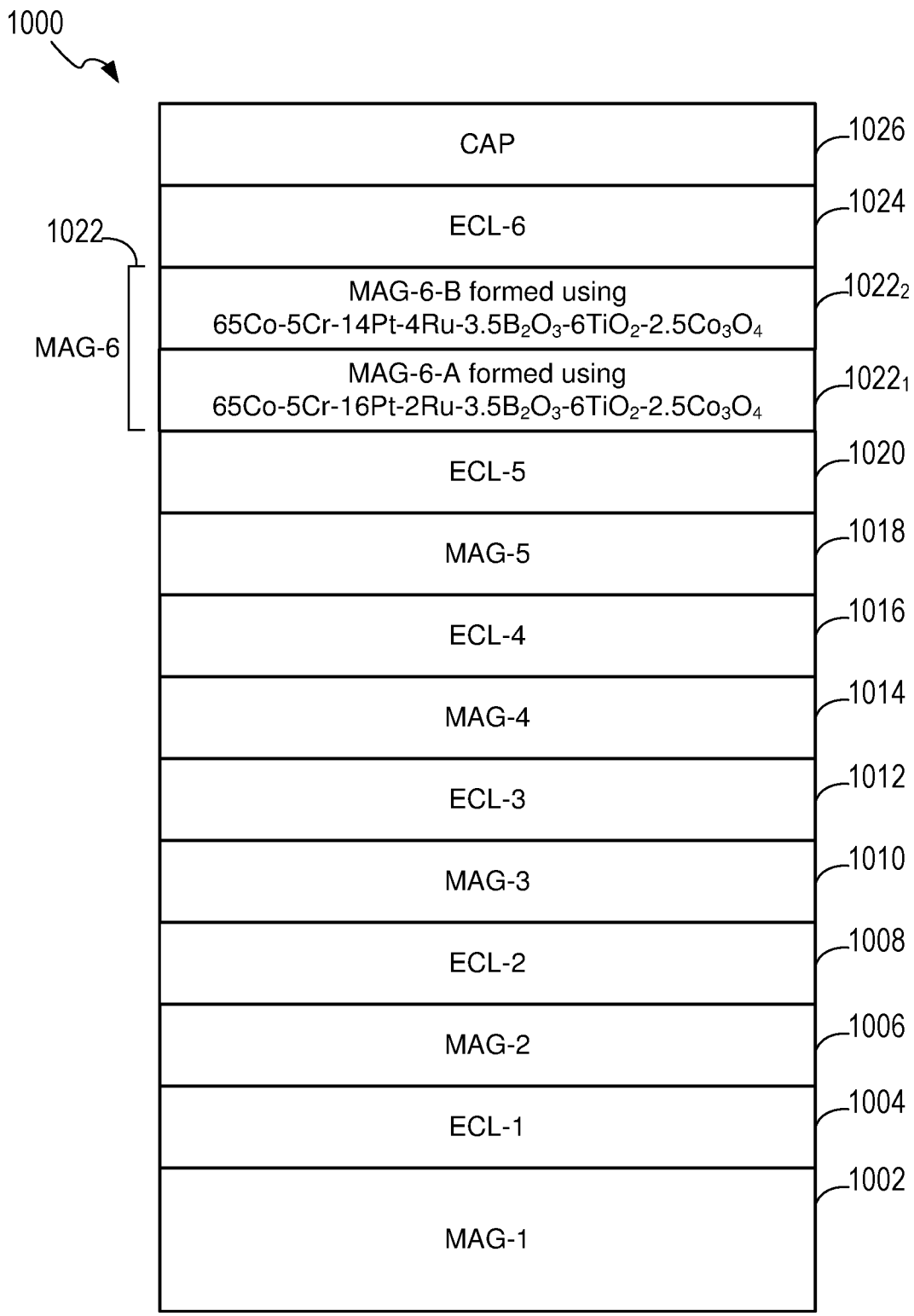
FIG. 11 is a side cross sectional view of a magnetic recording layer structure having magnetic recording sublayers and non-magnetic exchange control sublayers in accordance with yet another embodiment of the disclosure, wherein a topmost magnetic recording sublayer is formed with graded Pt and Ru concentrations.

FIG. 11 is a side cross sectional view of the magnetic recording layer structure 1000 in accordance with another embodiment of the disclosure. The magnetic recording layer structure 1000 includes six magnetic recording sublayers 1002, 1006, 1010, 1014, 1018, and 1022 (denoted MAG-1, MAG-2, MAG-3, MAG-4, MAG-5, and MAG-6) and six non-magnetic exchange control sublayers 1004, 1008, 1012, 1016, 1020, and 1024 (denoted ECL-1, ECL-2, ECL-3, ECL-4, ECL-5, and ECL-6) arranged in an alternating pattern. In the example of FIG. 11, MAG-6 sublayer 1022 includes two films (or sub-sublayers) MAG-6-A 1022$_1$ and MAG-6-B 1022$_2$, described in more detail below. In the example of FIG. 11, MAG-1 1002 is the bottom magnetic recording sublayer (e.g., the magnetic recording sublayer nearest the substrate that is shown in FIGS. 6-8), while MAG-6 1022 is the top magnetic recording sublayer (e.g., the magnetic recording sublayer farthest from the substrate that is shown in FIGS. 6-8).

In the example of FIG. 11, MAG-6 sublayer 1022 is configured with different concentrations of Pt (as well as other differing constituents such as Ru) within the two component films, MAG-6-A 1022$_1$ and MAG-6-B 1022$_2$, thus providing an intra-sublayer gradient in Ku and Ms within the MAG-6 sublayer 1022. In the particular example of FIG. 11, MAG-6-A 1022$_1$ is formed using 65Co-5Cr-16Pt-2Ru-3.5B$_2$O$_3$-6TiO$_2$-2.5Co$_3$O$_4$ and MAG-6-B 1022$_2$ is formed using 65Co-5Cr-14Pt-4Ru-3.5B$_2$O$_3$-6TiO$_2$-2.5Co$_3$O$_4$ (where the numerical values in the formulae, e.g. 65, 5, 16, etc., are concentrations represented as atomic percentages in the case of elements and molecular percentages in the case of oxides). That is, the Pt concentration of MAG-6-A 1022$_1$ is higher than or greater than the Pt concentration of MAG-6-B 1022$_2$. Note also that the Ru concentration of MAG-6-A 1022$_1$ is lower than the Ru concentration of MAG-6-B 1022$_2$. The exemplary values shown in FIG. 11 are merely illustrative and can be varied within appropriate ranges consistent with the teachings herein. For example, the Pt concentration value of MAG-6-A may differ from 16% (atomic percentage) and may be, for example, in the range of 12% to 18%. The Pt concentration value of MAG-6-B may differ from 14% (atomic percentage) and may be, for example, in the range of 10% to 16%. As already explained, the Pt concentration of MAG-1-B should be lower than that of MAG-1-A. Additionally, the Ru concentration value of MAG-6-A may differ from 2% (atomic percentage) and may be, for example, in the range of 0% to 4%. The Ru concentration value of MAG-6-B may differ from 4% (atomic percentage) and may be, for example, in the range of 2% to 6%. As already explained, the Ru concentration of MAG-6-B should be higher than that of MAG-6-A.

Each of the other magnetic recording sublayers 1002, 1006, 1010, 1014, and 1018 can be made of one or more magnetic materials, such as CoPt and/or CoCrPt, or other magnetic materials suitable for storing information magnetically. In some examples, each of the magnetic recording sublayers 1002, 1006, 1010, 1014, and 1018 is made of a cobalt alloy including platinum. In addition, one or more of the magnetic recording sublayers 1002, 1006, 1010, 1014, and 1018 may further include one or more additional materials, such as those containing elements of Cr, B, Ru, and/or combinations thereof. In one aspect, each of the magnetic recording sublayers 1002, 1006, 1010, 1014, and 1018 includes magnetic grains (e.g., made of a cobalt alloy including platinum, such as CoPt and/or CoCrPt) embedded within a mixture of one or more oxide segregants. The grains may exhibit columnar growth during deposition. Suitable oxide segregants may include, but are not limited to, SiO$_2$, TiO$_2$, Cr$_2$O$_3$, B$_2$O$_3$, MnO, CoO, Co$_3$O$_4$, and/or combinations thereof. Each of the non-magnetic exchange control sublayers 1004, 1008, 1012, 1016, 1020, and 1024 can be made of one or more materials, such as CoRu and/or CoRuCr with an oxide segregant, such as TiO$_2$, or other suitable non-magnetic material. In one embodiment, the magnetic recording layer structure 1000 may also include a capping layer 1026. In such case, the capping layer can be made of one or more materials such as Co, Pt, Cr, B, combinations thereof, and/or other suitable materials known in the art.

In addition to the intra-sublayer gradient provided within sublayer 1002, to further increase the ADC, while improving the media SNR, the magnetic recording layer structure 1000 may include an inter-sublayer gradient of platinum across the various magnetic recording sublayers 1002, 1006, 1010, 1014, 1018, and 1022, as already explained.

Table II illustrates sublayer thicknesses for an illustrative and non-limiting example. Note that, in the example of Table II, as in the example of Table I, the GIIL, Ru, and CoRuCr sublayers formed above the magnetic seed layer and beneath MAG-1 correspond to the intermediate layers 508, 608 or 708 of FIG. 6, 7, or 8. Note also that the MAG-1 layer of Table I has the same exemplary thickness (31 Å) as the MAG-1 layer of Table II, although the MAG-1 layer of Table I has a pair of films (MAG-1-A and MAG-1-B) and the MAG-1 layer of Table II does not. That is, the MAG-1 layer of Table I is not necessarily thicker than other layers of Table I because it includes a pair of films. Likewise the MAG-6 layer of Table I has the same exemplary thickness (25 Å) as the MAG-6 layer of Table II, although the MAG-6 layer of Table II has a pair of films (MAG-6-A and MAG-6-B) and the MAG-6 layer of Table I does not. That is, the MAG-6 layer of Table II is not necessarily thicker than other layers of Table II because it includes a pair of films.

Hence it is noted that sublayers MAG-1 and MAG-6 may be made thicker than the other sublayers to achieve benefits in performance even if they are not formed with a dual layer structure. Note also that if a thin sublayer such as sublayer MAG-4 were to be formed with a dual layer structure, the thin sublayer may need to be made considerably thicker than 4 Å to accommodate the dual layer structure. In many examples, to gain the benefits from a dual layer structure, the individual films of the sublayer should be at least 10 Å thick.

TABLE II

| SUBLAYER | THICKNESS (angstroms) |
| --- | --- |
| CAP | 11 |
| ECL-6 | 18 |
| MAG 6 including MAG-6-B and MAG-6-A | 25 |
| ECL-5 | 12 |
| MAG-5 | 6 |
| ECL-4 | 7 |
| MAG-4 | 4 |
| ECL-3 | 4 |
| MAG-3 | 4 |
| ECL-2 | 7 |
| MAG-2 | 12 |
| ECL-1 | 6 |
| MAG-1 | 31 |
| GIIL | 19 |
| Ru | 110 |
| CoRuCr | 37 |
| Mag Seed | 30 |
| SUL | 65 |
| AF-coupling | 7 |
| SUL | 65 |

Figure 12:
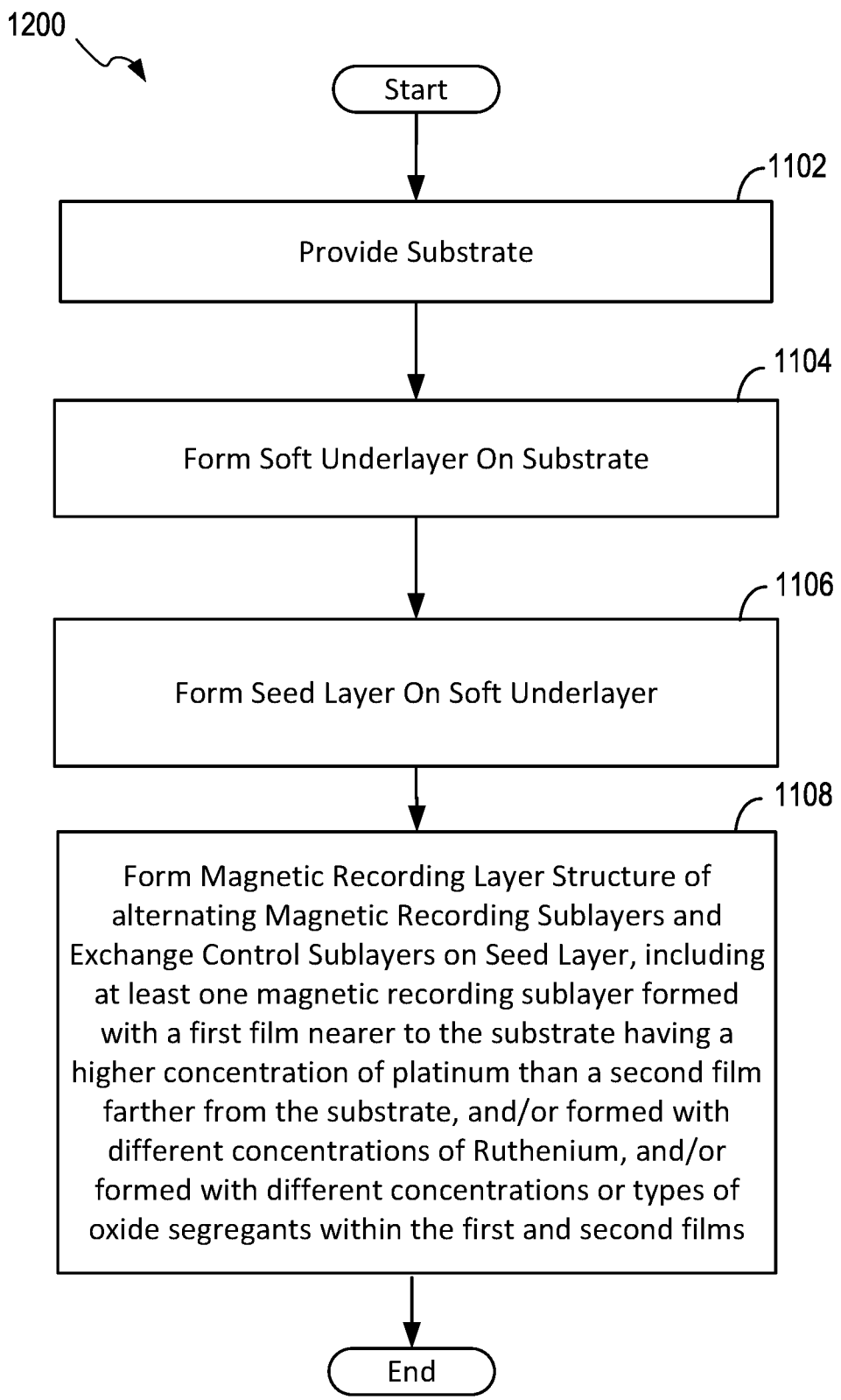
FIG. 12 is a flowchart of a process for fabricating a magnetic medium including a magnetic recording layer structure having magnetic recording sublayers and non-magnetic exchange control sublayers in accordance with one embodiment of the disclosure, including at least one magnetic recording sublayer formed with a first film nearer to the substrate having a higher concentration of platinum than a second film farther from the substrate, and/or formed with different concentrations of Ruthenium, and/or formed with different concentrations or types of oxide segregants within the first and second films.

FIG. 12 is a flowchart of a process 1100 for fabricating a magnetic medium including a magnetic recording layer structure having alternating magnetic recording sublayers and non-magnetic exchange control sublayers in accordance with one embodiment of the disclosure. In particular embodiments, the process 1100 can be used to fabricate the magnetic media described above including media 500, 600, 700, 800, 900, and/or 1000. At block 1102, a substrate (e.g., substrate 502 of FIG. 5) is provided or otherwise obtained. At block 1104, a soft underlayer (e.g., SUL 504 in FIG. 5) is formed on the substrate by a fabrication system, such as a sputter deposition system). At block 1106, a seed layer (e.g., seed layer 506 in FIG. 5) is formed on the SUL by the fabrication system. In addition, one or more optional intermediate layers (e.g., intermediate layer(s) 508 in FIG. 5) may also be formed on the seed layer by the fabrication system.

At block 1108, a magnetic recording layer structure of alternating magnetic recording sublayers and non-magnetic exchange control sublayers is formed on the seed layer, including at least one magnetic recording sublayer formed with first and second films, with the first film nearer to the substrate than the second film, and with the first film having a higher concentration of platinum than the second film, and/or formed with different concentrations of Ruthenium within the first and second films, and/or formed with different concentrations or types of oxide segregants within the first and second films.

In an aspect, at least six magnetic recording sublayers and at least six exchange control sublayers are included in the magnetic recording layer structure. For example, a first or bottom magnetic recording sublayer may be formed on the seed layer, where the bottom magnetic recording sublayer includes first and second films, with the first film having a higher concentration of platinum than the second film, and with the first film nearer to the substrate than the second film, a first exchange control sublayer may be formed on the first magnetic recording sublayer, a second magnetic recording sublayer may be formed on the first exchange control sublayer, a second exchange control sublayer may be formed on the second magnetic recording sublayer, a third magnetic recording sublayer may be formed on the second exchange control sublayer, a third exchange control sublayer may be formed on the third magnetic recording sublayer, a fourth magnetic recording sublayer may be formed on the third exchange control sublayer, a fourth exchange control sublayer may be formed on the fourth magnetic recording sublayer, a fifth magnetic recording sublayer may be formed on the fourth exchange control sublayer, a fifth exchange control sublayer may be formed on the fifth magnetic recording sublayer, a sixth magnetic recording sublayer may be formed on the fifth exchange control sublayer, where the sixth magnetic recording sublayer includes first and second films, with the first film having a higher concentration of platinum than the second film, and with the first film nearer to the substrate than the second film, and a sixth exchange control sublayer may be formed on the sixth magnetic recording sublayer. In some examples, a capping layer (e.g., non-oxide containing recording layer) may be formed on the sixth exchange control sublayer.

Each of the magnetic recording sublayers includes oxide-containing magnetic materials (e.g., made of a cobalt alloy including platinum, such as CoPt and/or CoCrPt together with one or more oxide segregants, including, but not limited to, $SiO_2$, $TiO_2$, $Cr_2O_3$, $B_2O_3$, MnO, CoO, $Co_3O_4$, and/or combinations thereof). Each of the non-magnetic exchange control sublayers can be made of one or more materials, such as CoRu and/or CoRuCr with an oxide segregant, such as $TiO_2$, or other suitable non-magnetic material.

In addition to providing the aforementioned gradients within at least one of the magnetic recording sublayers (i.e., an intra-sublayer platinum gradient), the magnetic recording layer structure may be further formed so that a gradient of platinum is present across the magnetic recording sublayers (i.e., an inter-sublayer platinum gradient). In some examples, the bottom magnetic recording sublayer may include the highest platinum content from among the magnetic recording sublayers, while the top magnetic recording sublayer may include the lowest platinum content from among the magnetic recording sublayers. For example, the top magnetic recording sublayer may include a platinum content between about 10% and 18% (atomic percent), while the bottom magnetic recording sublayer may include a platinum content between about 19% and 24% (atomic percent). Each additional magnetic recording sublayer between the top and bottom magnetic recording sublayers may include a platinum content between the highest and lowest platinum contents that is equal to or less than the platinum content of the next-lower adjacent magnetic recording sublayer.

In addition, the thickness of the top and bottom magnetic recording sublayers may be larger than the thickness of the intermediate magnetic recording sublayers. For example, the thickness of the top and bottom magnetic recording sublayers may be between 20 and 50 angstroms, while the thickness of the additional intermediate magnetic recording sublayers may be between 2 and 20 angstroms.

In one aspect, the soft underlayer and seed layer are deposited at an ambient room temperature (e.g., without applying heat prior to or during deposition). In one aspect, the magnetic recording layer structure may be deposited at a temperature of about 150 degrees Celsius, or a temperature in the range from 50 to 340 degrees Celsius.

In one embodiment, the process can perform the sequence of actions in a different order. In another embodiment, the process can skip one or more of the actions. In other embodiments, one or more of the actions are performed simultaneously. In some embodiments, additional actions can be performed. For example, in one aspect, the process may include any additional actions needed to fabricate the magnetic layer structure of the media 500, 600, 700, 800, 900, and/or 1000.

In several embodiments, the forming or deposition of such layers can be performed using a variety of deposition sub-processes, including, but not limited to PVD, DC sputter deposition, ion beam deposition, radio frequency sputter deposition, or CVD, including PECVD, LPCVD and ALCVD. In other embodiments, other suitable deposition techniques known in the art may also be used.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A magnetic medium, comprising:
   a substrate; and
   a magnetic recording layer structure on the substrate, the magnetic recording layer structure comprising an alternating pattern of magnetic recording sublayers and non-magnetic exchange control sublayers;
   wherein at least one of the magnetic recording sublayers comprises first and second films, with the first film nearer to the substrate than the second film, wherein each of the first and second films comprises both Pt and Ru, with the first film having a higher concentration of Pt than the second film, and with the first film having a lower concentration of Ru than the second film.

2. The magnetic medium of claim 1, wherein the first film further comprises Co and Cr with a first segregant and the second film further comprises Co and B with a second segregant.

3. The magnetic medium of claim 2, wherein the first and second segregants comprise one or more of $B_2O_3$, $SiO_2$, $Cr_2O_3$, $TiO_2$, or CoO.

4. The magnetic medium of claim 1, wherein the first film further comprises Co, Cr, $B_2O_3$, $SiO_2$, $TiO_2$, and CoO and the second film further comprises Co, B, $SiO_2$, $Cr_2O_3$, and CoO.

5. The magnetic medium of claim 1, wherein the first film further comprises Co, Cr, $B_2O_3$, $SiO_2$, $TiO_2$, and $Co_3O_4$ and the second film also further comprises Co, Cr, $B_2O_3$, $SiO_2$, $TiO_2$, and $Co_3O_4$.

6. The magnetic medium of claim 1, wherein the at least one of the magnetic recording sublayers comprising the first and second films comprises a magnetic recording sublayer closest to the substrate.

7. The magnetic medium of claim 1, wherein the at least one of the magnetic recording sublayers comprising the first and second films comprises a magnetic recording sublayer farthest from the substrate.

8. The magnetic medium of claim 1, wherein the magnetic recording layer structure comprises fewer than six of the magnetic recording sublayers.

9. The magnetic medium of claim 1, wherein the magnetic recording layer structure comprises at least six of the magnetic recording sublayers.

10. The magnetic medium of claim 1, wherein the at least one of the magnetic recording sublayers comprising the first and second films further comprises at least a third film, wherein the third film comprises both Pt and Ru, wherein a concentration of the Pt in the third film is between the respective concentrations of Pt in the first and second films, and wherein a concentration of the Ru in the third film is between the respective concentrations of Ru in the first and second films.

11. The magnetic medium of claim 1, wherein the first film further comprises an oxide segregant that has a different concentration than a concentration of an oxide segregant of the second film.

12. A magnetic recording device, comprising the magnetic medium of claim 1 and a recording head configured to write information to the magnetic medium.

13. A magnetic medium, comprising:
    a substrate; and
    a magnetic recording layer structure on the substrate, the magnetic recording layer structure comprising an alternating pattern of magnetic recording sublayers and non-magnetic exchange control sublayers;
    wherein the magnetic recording sublayers comprise a first magnetic recording sublayer nearest to the substrate, a second magnetic recording sublayer farthest from the substrate, and one or more intermediate magnetic recording sublayers, and wherein the first and second magnetic recording sublayers are thicker than each of the one or more intermediate magnetic recording sublayers; and
    wherein at least one of the first and second magnetic recording sublayers comprises first and second films, each of the first and second films comprising both Pt and Ru, with the first film having a higher concentration of Pt than the second film, and with the first film having a lower concentration of Ru than the second film.

14. The magnetic medium of claim 13, wherein the first film is nearer to the substrate than the second film.

15. The magnetic medium of claim 13, wherein the first magnetic recording sublayer nearest to the substrate and the second magnetic recording sublayer farthest from the substrate each comprise two or more films having different concentrations of Pt.

16. The magnetic medium of claim 13, wherein the first magnetic recording sublayer nearest to the substrate and the second magnetic recording sublayer farthest from the substrate are each at least twenty angstroms thick, and wherein the one or more intermediate magnetic recording sublayers are each less than twenty angstroms thick.

17. A magnetic recording device comprising the magnetic medium of claim 13 and a recording head configured to write information to the magnetic medium.

18. A method for fabricating magnetic media, comprising:
providing a substrate;
forming a soft underlayer on the substrate;
forming a seed layer on the soft underlayer; and
forming a magnetic recording layer structure on the seed layer, the magnetic recording layer structure comprising an alternating pattern of magnetic recording sublayers and non-magnetic exchange control sublayers;
wherein at least one of the magnetic recording sublayers is formed to include first and second films, with the first film nearer to the substrate than the second film, wherein each of the first and second films is formed to comprise both Pt and Ru, with the first film having a higher concentration of Pt than the second film, and with the first film having a lower concentration of Ru than the second film.

19. The method of claim 18, wherein the first film is formed to further comprise Co and Cr with a first segregant and the second film is formed to further comprise Co and B with a second segregant.

20. The method of claim 18, wherein the at least one of the magnetic recording sublayers comprises a magnetic recording sublayer closest to the substrate.

21. The method of claim 18, wherein the at least one of the magnetic recording sublayers comprises a magnetic recording sublayer farthest from the substrate.

22. The method of claim 18, wherein the first film is formed with a higher total concentration of oxides than a total concentration of oxides of the second film.

23. The method of claim 18, wherein the first film comprises a first oxide segregant, and wherein the second film comprises a second oxide segregant different from the first oxide segregant.

24. The magnetic medium of claim 1, wherein the first film and the second film are not separated by a non-magnetic layer.

25. The magnetic medium of claim 1, wherein the at least one of the magnetic recording sublayers comprises a topmost magnetic recording sublayer of a stack of at least six magnetic recording sublayers.

26. The magnetic medium of claim 1, wherein the first film further comprises an oxide segregant and the second film further comprises a different oxide segregant.

27. The method of claim 18, wherein the first film and the second film are not separated by a non-magnetic layer.

28. The method of claim 18, wherein the at least one of the magnetic recording sublayers is formed as a topmost magnetic recording sublayer of a stack of at least six magnetic recording sublayers.

* * * * *